United States Patent [19]
Suzuki et al.

[11] Patent Number: 6,125,143
[45] Date of Patent: Sep. 26, 2000

[54] PICTURE ENCODING DEVICE AND METHOD THEREOF, PICTURE DECODING DEVICE AND METHOD THEREOF, AND RECORDING MEDIUM

[75] Inventors: Teruhiko Suzuki, Chiba; Masami Ogata, Kanagawa; Tak Yen Tong, Tokyo, all of Japan

[73] Assignee: Sony Corporation, Tokyo, Japan

[21] Appl. No.: 08/733,928

[22] Filed: Oct. 18, 1996

[30] Foreign Application Priority Data

Oct. 26, 1995 [JP] Japan ................................. 7-303500

[51] Int. Cl.$^7$ ................................................. H04N 7/30
[52] U.S. Cl. ........................ 375/240.11; 348/398.1; 348/403.1; 348/420.1; 375/240.24
[58] Field of Search ............................ 348/400–403, 348/409–412, 420, 398, 397, 404, 415, 416; 382/232, 236, 238, 240, 249, 250; 345/202

[56] References Cited

U.S. PATENT DOCUMENTS

| | | | |
|---|---|---|---|
| 4,941,193 | 7/1990 | Barnsley et al. | 382/56 |
| 4,974,187 | 11/1990 | Lawton | 364/728.01 |
| 5,014,134 | 5/1991 | Lawton et al. | 358/261.3 |
| 5,065,447 | 11/1991 | Barnsley et al. | 382/56 |
| 5,081,592 | 1/1992 | Jenq | 364/487 |
| 5,101,446 | 3/1992 | Resnikoff et al. | 382/56 |
| 5,237,410 | 8/1993 | Inoue | 358/136 |
| 5,398,067 | 3/1995 | Sakamoto | 348/403 |
| 5,440,345 | 8/1995 | Shimoda | 348/402 |
| 5,537,493 | 7/1996 | Wilkinson | 382/240 |
| 5,588,075 | 12/1996 | Chiba et al. | 382/246 |
| 5,590,139 | 12/1996 | Suzuki et al. | 386/112 |
| 5,600,373 | 2/1997 | Chui et al. | 348/397 |
| 5,677,734 | 10/1997 | Oikawa et al. | 348/405 |
| 5,748,243 | 5/1998 | Suzuki | 348/405 |

*Primary Examiner*—Howard Britton
*Attorney, Agent, or Firm*—Frommer, Lawrence & Haug, LLP.; William S. Frommer; Joe H. Shallenburger

[57] ABSTRACT

A picture is divided into either one of three types of macroblocks and then encoded in such a manner that block distortion, mosquito noise and ringing are reduced while picture coding efficiency is improved.

25 Claims, 36 Drawing Sheets

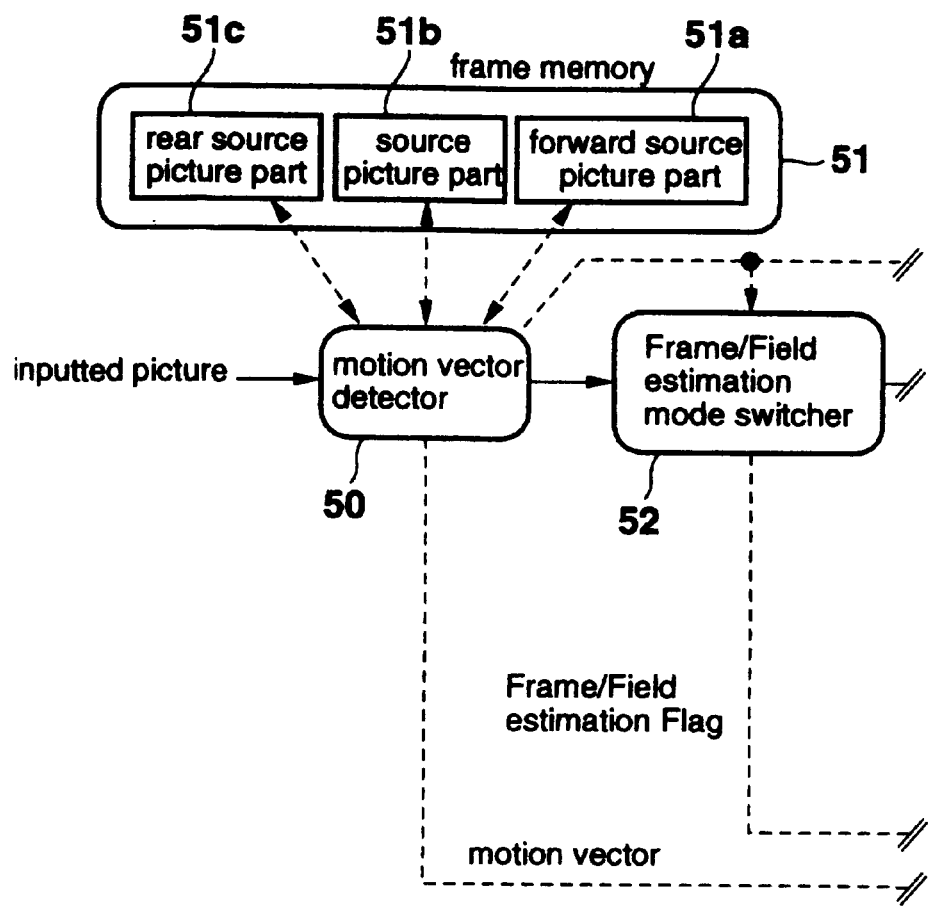

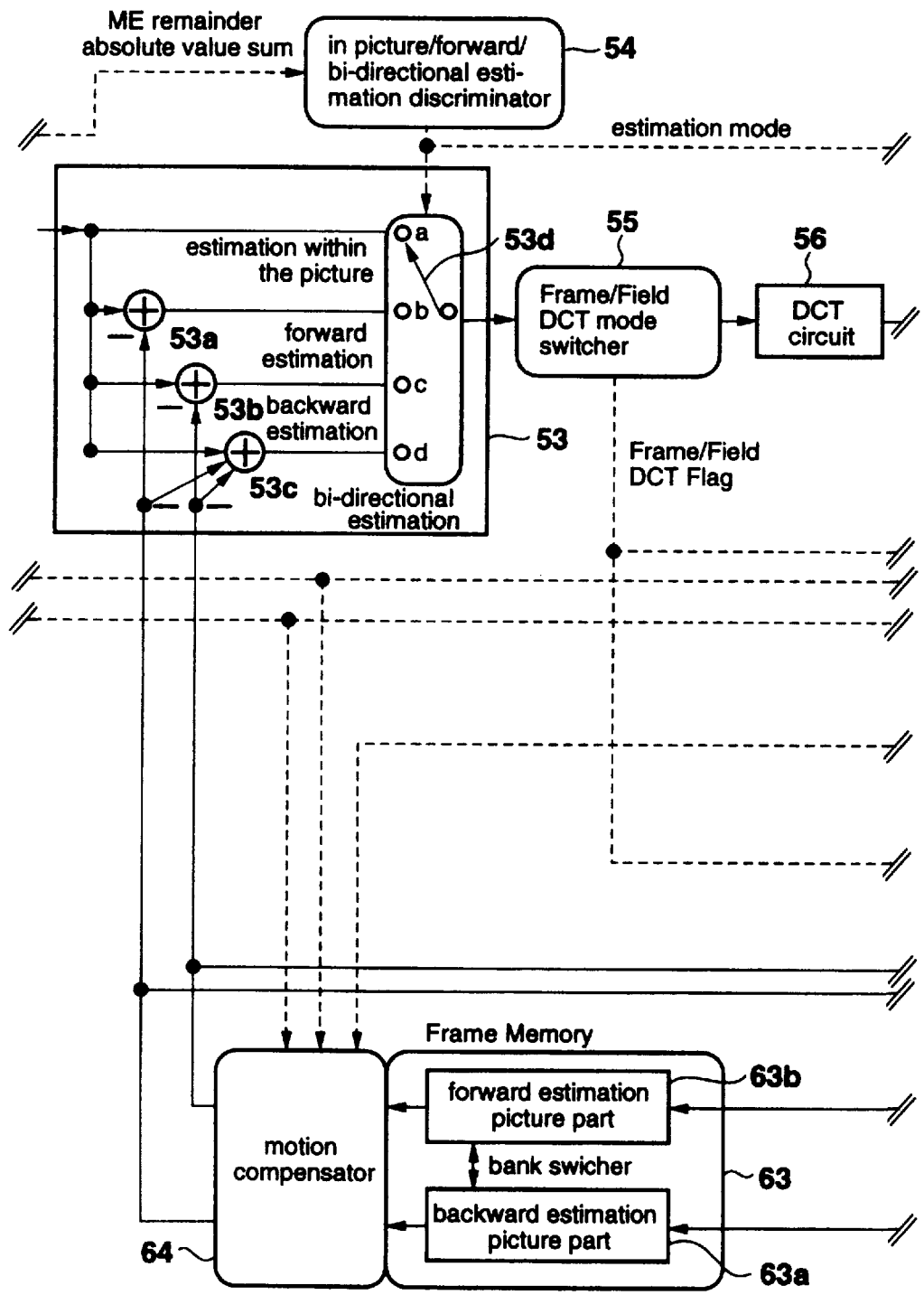

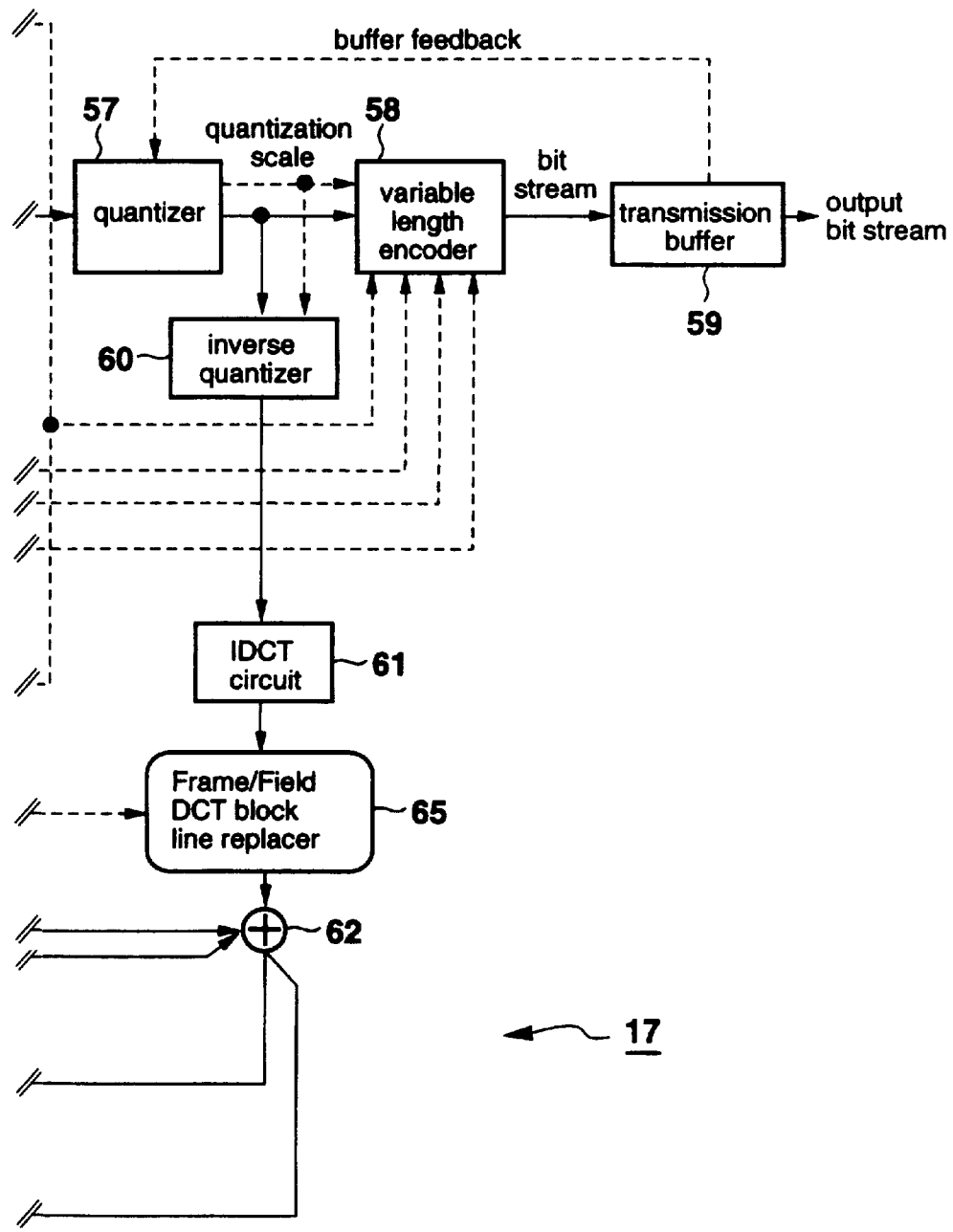

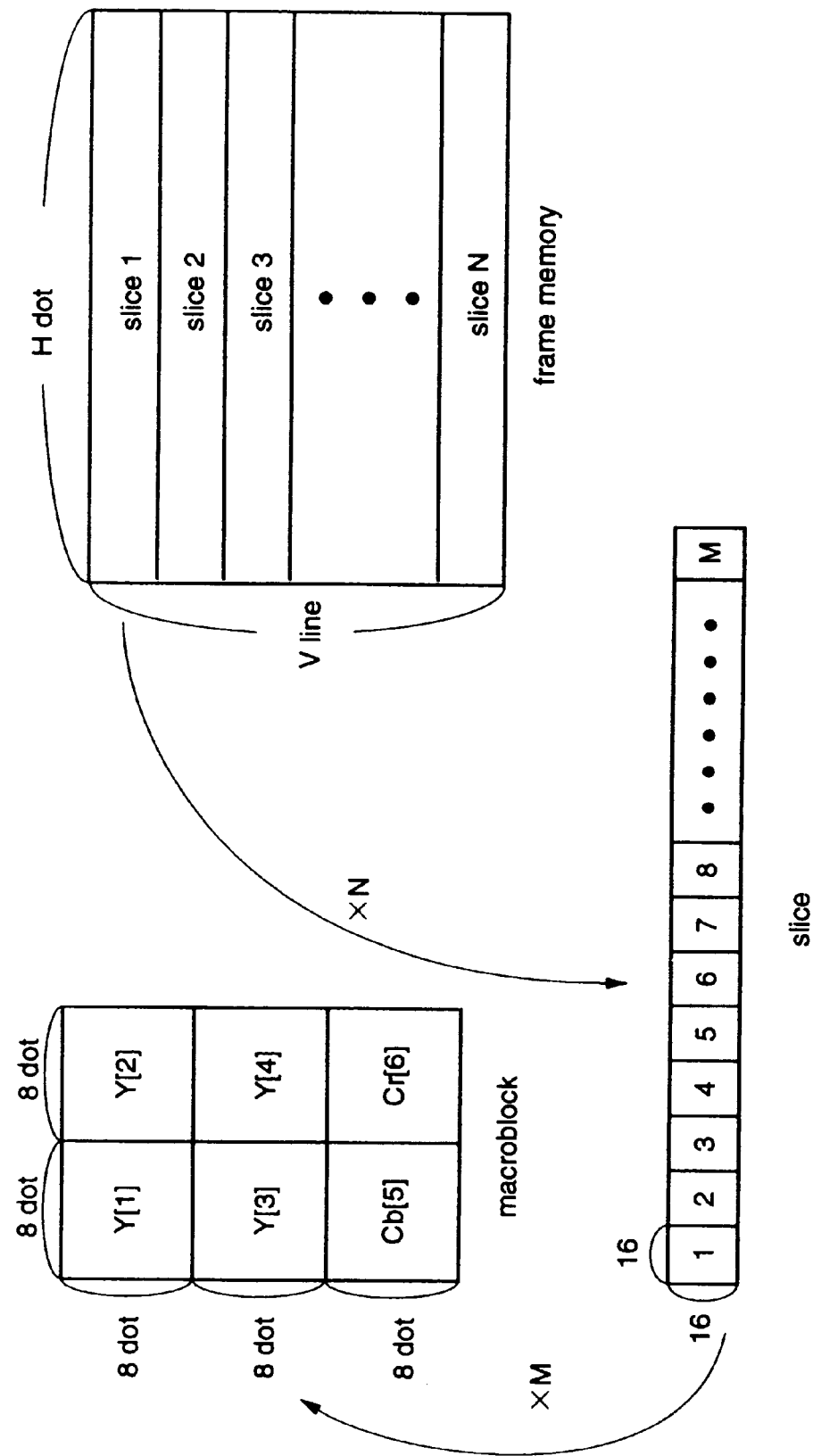

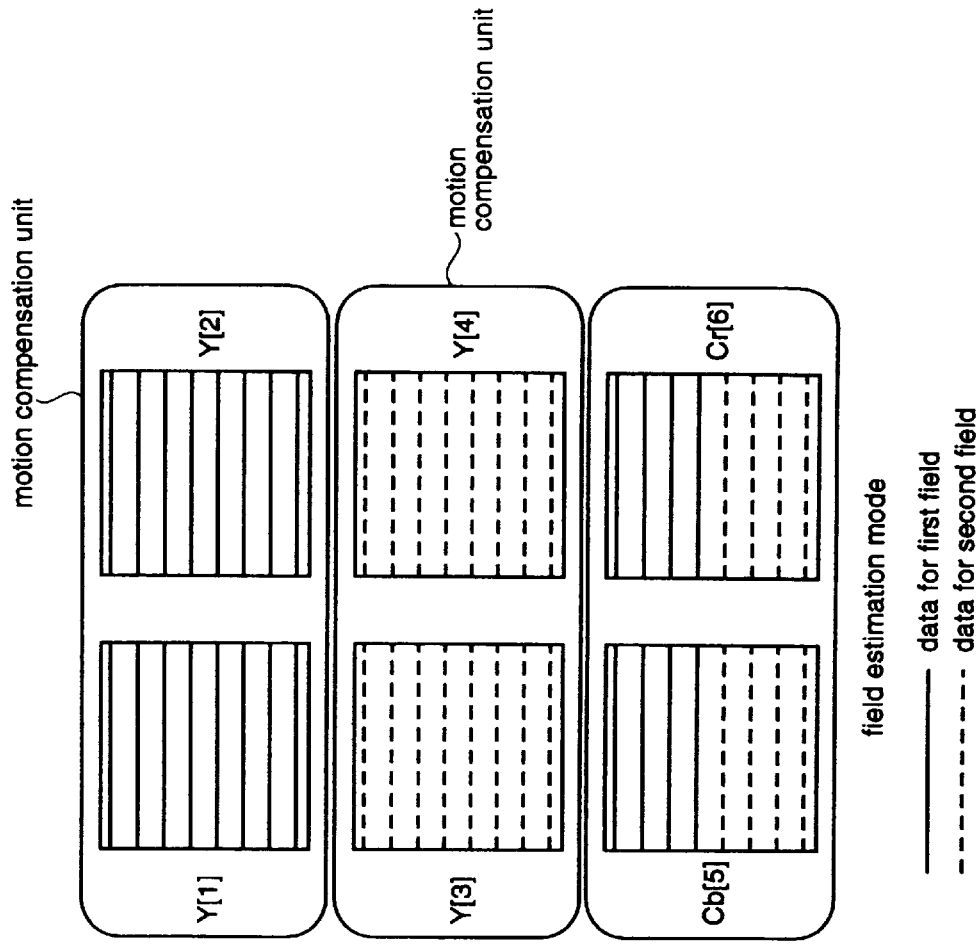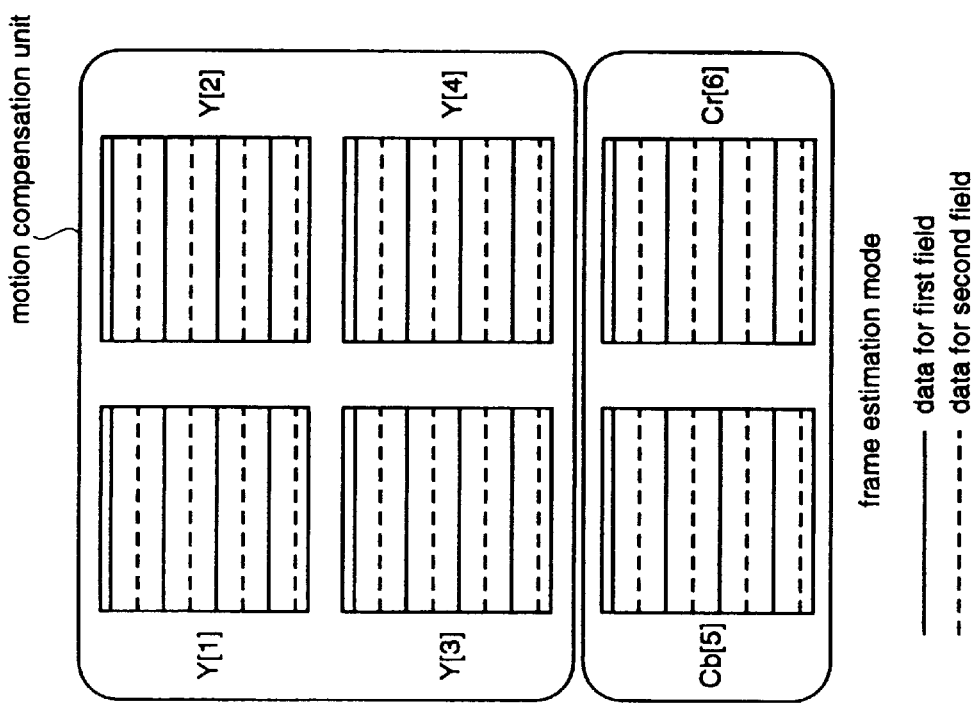

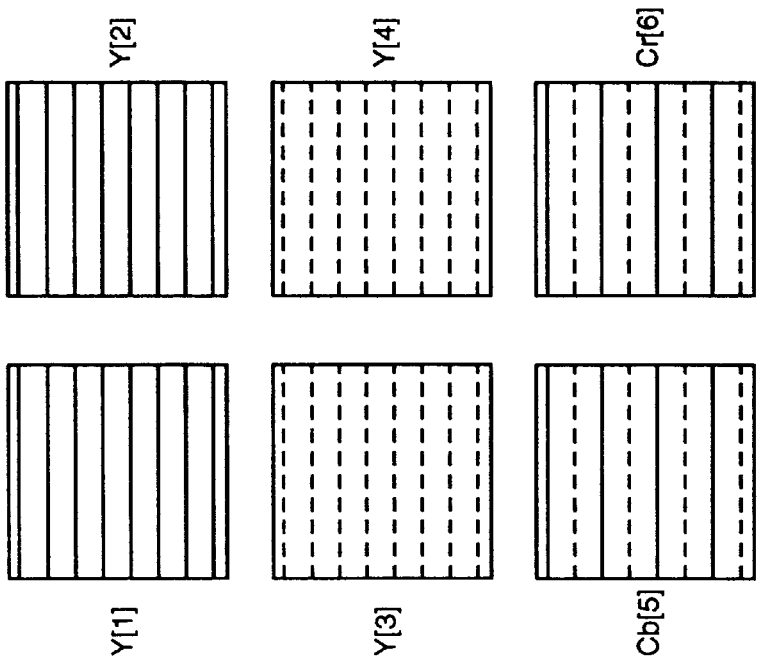
FIG. 8A
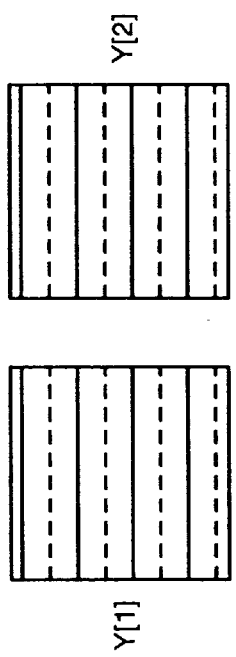 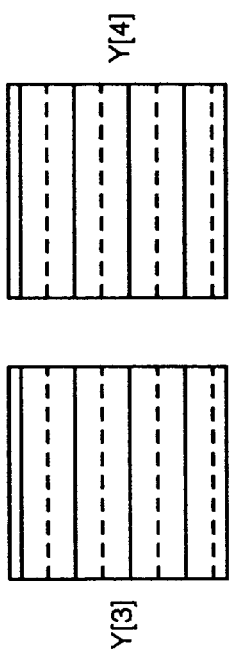 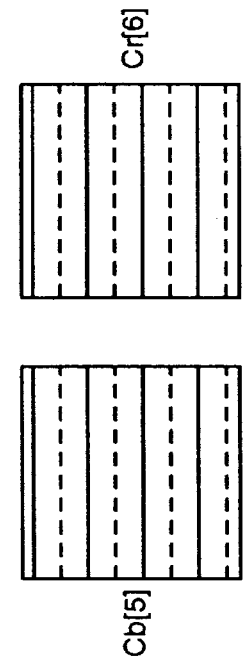
FIG. 8B

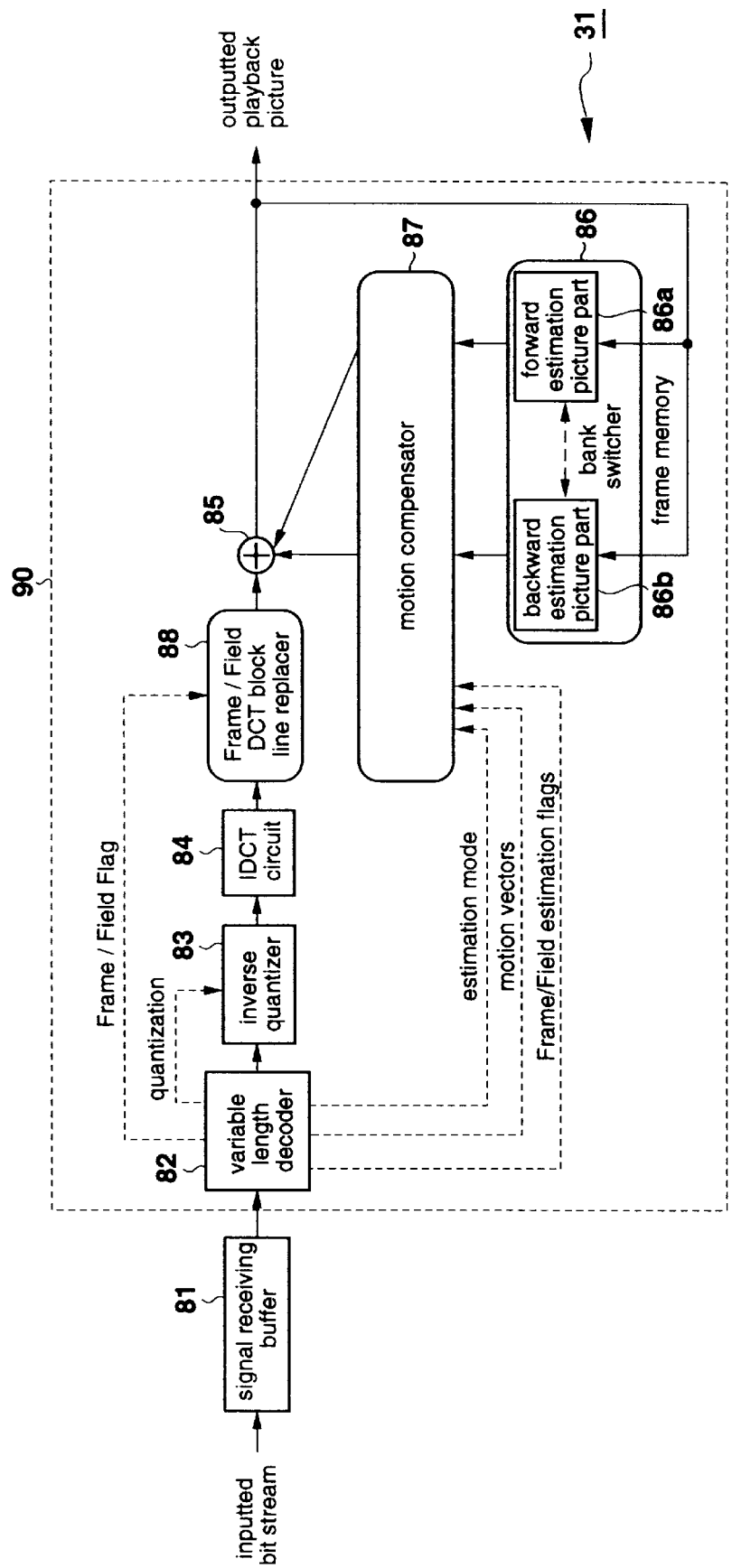

| 12A | 12B |

| 12A | 12B |

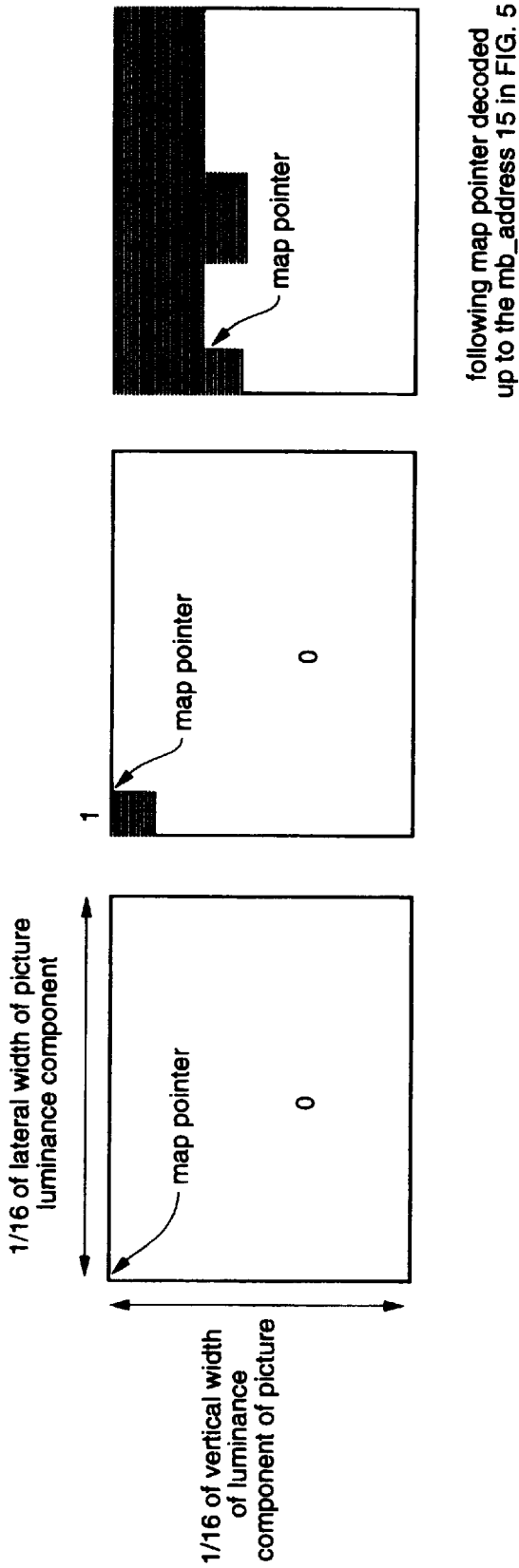

FIG. 25

```
sequence_header ( )    {                              No. of bits    Mnemonic
    sequence_header_code                                    32       bslbf
    horizontal_size_value                                   12       uimsbf
    vertical_size_value                                     12       uimsbf
    aspect_ratio_information                                 4       uimsbf
    frame_rate_value                                         4       uimsbf
    bit_rate_value                                          18       uimsbf
    marker_bit                                               1       "1"
    vbv_buffer_size_value                                   10       uimsbf
    wavelet_layer_number                                     4       uimsbf
    wavelet_coefficients ( )                          • • • • • • load_intra_weighting_matrix                              1
    if (load_intra_weighting_matrix)
        intra_weighting_matrix [ ]          8* (wavelet_layer_number *3+1)
                                                                     uimsbf load_non_intra_weighting_matrix                          1
    if (load_non_intra_weighting_matrix)
        non_intra_weighting_matrix [ ]      8* (wavelet_layer_number *3+1)
                                                                     uimsbf next_start_code ( )

```
wavelet_coefficients ( ) {                          No. of bits   Mnemonic
    for ( i = 0 ; i < wavelet_layer_number ; i ++)
        wavelet_coeff_index                               8        uimsbf
}
```

FIG. 26B

```
wavelet_coefficients ( ) {                          No. of bits   Mnemonic
    for ( i = 0 ; i < wavelet_layer_number ; i ++) {
        lowpass_tap_number                                8        uimsbf
        wavelet_coeff_index [ ]                          8*        lowpass_tap_number
                                                                   uimsbf
        highpass_tap_number                               8        uimsbf
        wavelet_coeff_index [ ]                          8*        highpass_tap_number
                                                                   uimsbf
}
```

FIG. 27

```
group_of_pictures_header ( ) {                No. of bits    Mnemonic
    group_start_code                              32          bslbf
    time_code                                     25
    closed_gop                                     1
    broken_link                                    1 next_start_code ( )

```
picture_header () {                                              No. of bits   Mnemonic
    picture_start_code                                                32        bslbf
    temporal_reference                                                10        uimsbf
    picture_coding_type                                                3        uimsbf
    vbv_delay                                                         16        uimsbf
    number_of_macroblock                                              16        uimsbf
    if (picture_coding_type == 2 || picture_coding_type == 3) {
        vector_full_pel_forward                                        1
        forward_f_code                                                 3        uimsbf
    }
    if (picture_coding_type == 3) {
        full_pel_backward_vector                                       1
        backward_f_code                                                3        uimsbf
    }
    next_start_code ()
}
```

FIG. 29

```
macroblock ( ) {                                                No. of bits    Mnemonic
    while (nextbits ( ) == ' 0000 0001 000* )
        macroblock_escape                                       11             vlclbf
    macroblock_adress_incremant                                 1-11           vlclbf
    macroblock_type                                             1-9            vlclbf
    macroblock_size                                             2              uimsbf
    if (macroblock_quant)
        quantizer_scale_code                                    5              uimsbf
    if ((macroblock_motion_forward || macroblock_motion_backward) &&
        mb_size == 16)
        mc_mode                                                 1
    if (macroblock_motion_forward)                              ...            ...
        motion_vectors (0)
    if (macroblock_motion_backward)                             ...            ...
        motion_vectors (1)
    if (macroblock_intra && picture_coding_type != 1 ) {
        for ( i = 0 ; i < 6 ; i++ ) {
            if ( i < 4 )  {
                intra_dc_size_luminance                         2-9            vlclbf
                if (intra_dc_size_luminance != 0)
                    intra_dc_differencial                       1-11           uimsbf
            } else  {
                intra_dc_size_chrominance                       2-9            vlclbf
                if (intra_dc_size_luminance != 0)
                    intra_dc_chrominance                        1-11           uimsbf
            }
        }
    }
    wavelet_coefficients ( )                                    ...
}
```

FIG. 30

The properties of the macroblock are determined by the macroblock_type VCL-accoding to these tables.
Variable length codes for macroblock_type in I-pictures

| macroblock_type VCL code | macroblock_quant | macroblock_motion_forward | macroblock_motion_backward | macroblock_inter | Description |
|---|---|---|---|---|---|
| 1 | 0 | 0 | 0 | 1 | Intra |
| 01 | 1 | 0 | 0 | 1 | Intra, Quant |

FIG. 31

Variable length codes for macroblock_type in P-pictures

| macroblock_type VCL code | macroblock_quant | macroblock_motion_forward | macroblock_motion_backward | coded_macroblock | macroblock_inter | Description |
|---|---|---|---|---|---|---|
| 1 | 0 | 1 | 0 | 1 | 0 | MC, Coded |
| 01 | 0 | 0 | 0 | 1 | 0 | No MC, Coded |
| 001 | 0 | 1 | 0 | 0 | 0 | MC, Not Coded |
| 0001 1 | 0 | 0 | 0 | 0 | 1 | Intra |
| 0001 0 | 1 | 1 | 0 | 1 | 0 | MC, Coded Quant |
| 0000 1 | 1 | 0 | 0 | 1 | 0 | No MC, Coded Quant |
| 0000 01 | 1 | 0 | 0 | 0 | 1 | Intra, Quant |

FIG. 32

Variable length codes for macroblock_type in B-pictures

| macroblock_type VCL code | macroblock_quant | macroblock_motion_forward | macroblock_motion_backward | coded_macroblock | macroblock_inter | Description |
|---|---|---|---|---|---|---|
| 10     | 0 | 0 | 1 | 1 | 0 | Intrap, Not Coded |
| 11     | 0 | 1 | 1 | 0 | 0 | Intrap, Coded |
| 010    | 0 | 0 | 0 | 1 | 0 | Bwd, Not Coded |
| 011    | 0 | 0 | 1 | 1 | 0 | Bwd, Coded |
| 0010   | 1 | 1 | 0 | 0 | 0 | Fwd, Not Coded |
| 0011   | 0 | 1 | 0 | 1 | 0 | Fwd, Coded |
| 0001 1 | 0 | 0 | 0 | 0 | 1 | Intra |
| 0001 0 | 1 | 1 | 0 | 1 | 0 | Intrap, Coded, Quant |
| 0000 11| 1 | 0 | 1 | 1 | 0 | Fwd, Coded, Quant |
| 0000 10| 1 | 0 | 0 | 1 | 0 | Bwd, Coded, Quant |
| 0000 01| 1 | 0 | 0 | 0 | 1 | Intra, Quant |

FIG. 33

```
motion_vectors (s)  {
    for ( i = 0 ; i < number_of_motion_vectors ; i ++)
        motion_vectors (s)
}
```

| | No. of bits | Mnemonic |
|---|---|---|
| motion_vectors (s) { | | |
|   motion_horizontal_code | 1-11 | vlclbf |
|   if (horaizontal_f != 1) && (motion_horizontal_code != 0) ) | | |
|     motion_horizontal_r | 1-8 | uimsbf |
|   if (dmv == 1) | | |
|     dmv_horizontal | 1-2 | vlclbf |
|   motion_vertical_code | 1-11 | vlclbf |
|   if ( (vertical_f != 1) && (motion_vertical_code != 0) ) | | |
|     motion_vertical_r | 1-8 | uimsbf |
|   if (dmv == 1) | | |
|     dmv_vertical | 1-2 | vlclbf |
| } | | |

PICTURE ENCODING DEVICE AND METHOD THEREOF, PICTURE DECODING DEVICE AND METHOD THEREOF, AND RECORDING MEDIUM

BACKGROUND OF THE INVENTION

The present invention relates to a picture encoding device and method thereof, a picture decoding device and method thereof, and a recording medium, and more particularly relates to a picture encoding device and method thereof, a picture decoding device and method thereof, and a recording medium suitable for use in transmission systems such as television conferencing systems, television telephone systems, broadcast equipment and multimedia database searching systems etc. where a moving picture signal is recorded on a recording medium such as a magneto-optical disc or magnetic tape, played back, and displayed on a displaying device such as a display, or where the moving picture signal is transmitted via a transmission path from a transmission side to a receiving side, received on the receiving side and displayed, or where, for example, the moving picture is edited and recorded.

In systems such as television conferencing systems or television telephone systems where moving picture (picture signals) signals are transmitted over remote distances, the picture signal is compression encoded utilizing the image signal line correlation and/or the inter-frame correlation in order to utilize the transmission path in an efficient manner.

When line correlation is utilized in this kind of case, the image signal is compressed using transform processing such as, for example, DCT (Discrete Cosine Transform) processing or wavelet transform processing.

Further, when inter-frame correlation is utilized, it is also possible for the image signal to be further compressed and encoded. For example, as shown in FIG. 1, when frame pictures PC1, PC2 and PC3 are generated at times t1, t2 and t3, respectively, the difference between the image signals for frame pictures PC1 and PC2 are calculated, PC12 is generated, the difference between frame pictures PC2 and PC3 is calculated and PC23 is generated. Generally, frame pictures that are neighboring with respect to time do not possess dramatic variations so when differences are calculated, these difference signals have only small values. This difference signal is then compressed and an amount of code is compressed.

However, the original picture cannot be decoded because only the difference signal is transmitted. The picture signals for pictures of each frame are therefore compression encoded as one of three types of picture, i.e. as I pictures, P pictures or B pictures.

As shown in FIG. 2A and 2B, a 17 frame picture signal from frame F1 to F17 is processed as a single unit as a group picture (GOP). The picture signal for the leading frame F1 is then encoded as an I picture, the second frame F2 as a B picture, and the third frame as a P picture etc., and these are then respectively processed. Processing is then carried out for B pictures and P pictures alternately from the fourth frame F4 to the seventeenth frame F17.

The picture signal for one frame portion of the I picture is transmitted as the I picture picture signal without modification. With regards to this, basically, as shown in FIG. 2A, the difference between the I picture and the P picture picture signal leading this P picture with respect to time is transmitted as the P picture picture signal. Further, basically, the difference between the average value of the image signals for both of the frames leading and following with respect to time are encoded as the B picture picture signal, as shown in FIG. 2B and then transmitted.

FIG. 3 shows the theory for the method for encoding the moving picture signal in this way. As shown in FIG. 3, this picture signal is transmitted (encoded within the picture) along the transmission path as transmission data FIX because the first frame F1 is processed as an I picture. With regards to this, the difference of the average values of the frame F1 preceding with respect to time and the frame F3 following with respect to time is calculated because the second frame F2 is processed as a B picture, with this difference then being transmitted as transmission data F2X.

Four types of process exist for this B picture. In a first process, the picture signal data for the original frame F2 is transmitted without modification as the transmission data F2X (SP1) (intra encoding), with processing being the same as that for the case of I pictures. In a second process, the difference with the picture signal for the frame F3 for one frame after is calculated and this difference (SP2) is transmitted (backward estimation encoding). In a third process, the difference (SP3) with the picture signal for the frame F1 preceding with respect to time is transmitted (forward estimation encoding). Further, in a fourth process, the difference (SP4) of the average values for frame F1 preceding with respect to time and frame F3 following with respect to time is generated and transmitted as the transmission data F2X (bi-directional estimation encoding).

The process of these four processes for which the transmission data is the least is then adopted.

When the difference data is transmitted, a motion vector x1 (a motion vector between frames F1 and F2) (in the case of forward estimation) between the images for the frames that are the targets of the difference calculation, a motion vector x2 (motion vector between frames F3 and F2) (in the case of reverse estimation) or both x1 and x2 (in the case of bidirectional estimation) are transmitted together with the difference data.

Regarding a third frame F3 processed as a P picture, the frame F1 leading with respect to time is taken as the estimation picture, the difference signal (SP3) with this frame and the motion vector x3 are calculated and this is transmitted as the transmission data F3X (forward estimation encoding). Alternatively, data for the frame F3 can be transmitted as the transmission data F3 (SP1) (intra encoding). The process of these processes for which the transmission data becomes small is then selected in the same way as for the B picture.

FIG. 4 shows an example structure of a device for encoding and then transmitting a moving picture signal, then receiving and encoding this signal based on the aforementioned theory. The encoding device 1 encodes an inputted picture signal and transmits this signal to a transmission path or to a recording medium 3. The decoding device 2 plays back a signal from the transmission path or the recording medium 3 and this signal is then decoded and outputted.

At the encoding device 1, the inputted picture signal is inputted to a processing circuit 11, divided into luminance and chrominance signals (in the case of this example, a color difference signal), with these signals then being analog to digital (A/D) converted by an A/D converter 12 and an A/D converter 13. The picture signals (picture data) A/D converted into digital signals by the A/D converters 12 and 13 are provided to and stored in a frame memory 14 after being filtered at a pre-filter 19. The frame memory 14 stores the luminance signal in a luminance signal frame memory 15 and the color difference signal in a color difference frame memory 16. An encoder 17 reads moving picture signals (picture data) stored in the frame memory 14 and carries out encoding. The details of this operation are described in detail later with reference to FIG. 5.

Signals encoded by the encoder 17 are transmitted as a bitstream via the transmission path 3 or recorded on the recording medium 3.

Data received from the transmission path or the recording medium 3 is then provided to a decoder 31 of the decoding device 2 and decoded. The details of the decoder 31 are described later with reference to FIG. 9.

Data decoded by the decoder 31 is provided to the frame memory 33. At this time, the luminance signal is provided to and stored in a luminance signal frame memory 34 of the frame memory 33 and the color difference signal is provided to and stored in the color difference signal frame memory 35. The luminance signal and the chrominance signal read from the luminance signal frame memory 34 and the color difference signal frame memory 35 are D/A converted D/A converters 36 and 37 after being filtered at a post filter 39, are provided to the processing circuit 38 and are then combined. These signals are then outputted to and displayed on, for example, a display such as a cathode ray tube (CRT), although this is not shown in the drawings.

Next, a description is given of the encoder operation for an example of a process for an MPEG (Moving Picture Experts Group) 2 method. This method was put forward as a standard proposal discussed in ISO-IEC/JTC1/SC29/WG11 and is a hybrid method standard for combining motion compensation estimation encoding and DCT (Direct Cosine Transform) encoding. The details of this moving picture signal encoding method are disclosed in IS13818-2.

An example structure of an encoder 17 for encoding moving images conforming to the above MPEG2 method is shown in FIG. 5.

Picture data to be encoded is inputted to a motion vector detector 50. The motion vector detector 50 processes each frame of picture data as an I picture, P picture or B picture in accordance with a preset prescribed sequence. Processing of each of the sequentially inputted frame pictures as an I, P or B picture is preset (for example, the group of pictures comprising the frames F1 to F17 is processed as I, B, P, B, P, . . . , as shown in FIG. 2A and FIG. 2B).

Picture data for frames (for example, F1) processed as I pictures is transferred from the motion vector detector 50 to a forward source picture part 51a of a frame memory 51 and stored. Picture data for frames (for example, frame F2) processed as B pictures are transferred to a source picture part 51b and stored. Picture data for frames (for example, F2) processed as B pictures is transferred to a backward source picture part 51c and stored.

Further, when frame pictures to be processed as B pictures (frame F4) or P pictures (frame F5) are inputted on the following timing, picture data for the first P picture (frame F3) stored up until this point in the backward source picture part 51c is transferred to the forward source picture part 51a, picture data for the next B picture (frame F4) is stored in (written to) the source picture part 51b, and picture data for the next P picture (frame F5) is stored in (written to) the backward source picture part 51c. The kind of process is then sequentially repeated.

Each of the picture signals stored in the frame memory 51 are read by the motion vector detector 50 in macro blocks of a fixed size. A description of macro blocks of the related art will now be given. As shown in FIG. 6, H dot lines of picture signals stored in the frame memory of the encoding device are made to be of a data format that can be gathered in V lines every one line. This one frame signal is divided into N slices in 16 line units, as shown in the drawings, with each slice then being divided into M macro blocks. Each microblock comprises a luminance signal corresponding to 16×16 pixels (dots), with this luminance signal then being further divided into blocks [1] to [4] in 8×8 dot units. This 16×16 dot luminance signal is made to correspond to an 8×8 dot Cb signal and an 8×8 dot Cr signal, with the above macro blocks being inputted to the motion vector detector 50.

Returning to FIG. 5, frame estimation mode processing and field estimation mode processing is carried out on the macro blocks outputted from the frame memory 51 at an estimation mode switcher 52. Further, calculations for estimations within the picture, forward estimations, backward estimations and bi-directional estimations are carried out at a computation part 53 under the control of an estimation discriminator 54. Which of these processes is used is decided in accordance with an estimation error signal (the difference between the reference picture taken as a processing target and the estimation picture for this). An absolute value sum (or squared sum) that can be used in this determination is generated by the motion vector detector 50.

Here, a description is given of the frame estimation mode and the field estimation mode occurring at the estimation mode switcher 52.

In the case where the frame estimation mode is set, the estimation mode switcher 52 outputs four luminance blocks Y[1] to Y[4] provided by the motion vector detector 50 to the following stage computation part 53 without modification. Namely, in this case, as shown in FIG. 7A, odd fields (the first field) line data and even field (second field) line data is in a mixed state at each luminance block. With this frame estimation mode, estimation is carried out in four luminance block units (macro blocks) so that one motion vector corresponds to four luminance blocks.

With regards to this, in field estimation mode the estimation mode switcher 52 converts to the structure shown in FIG. 7B and then outputs signals inputted from the motion vector detector 50 using the structure shown in FIG. 7A. Namely, of the four luminance blocks, the luminance blocks Y[1] and Y[2] are made to comprise only of dots for lines of odd numbered fields and the other two luminance blocks Y[3] and Y[4] are made to comprise only of even field line data before being outputted to the computation part 53. In this case, one motion vector corresponds to the two luminance blocks Y[1] and Y[2] and the remaining one vector corresponds to the two the other two luminance blocks Y[3] and Y[4].

The motion vector detector 50 outputs the absolute value sum of the estimation error occurring in frame estimation mode and the absolute value of the estimation error occurring in field estimation mode to the estimation mode switcher 52. The estimation mode switcher 52 compares the absolute value sum of the estimation errors in frame estimation mode and field estimation mode, performs processing corresponding to the estimation mode having the smaller value, and outputs data to the computation part 53. Further, the estimation mode switcher 52 outputs a flag (estimation flag) showing the mode corresponding to the executed process to a variable length encoder 58 and a motion compensator 64.

However, the process corresponding to the estimation mode is, in reality, carried out at the motion vector detector 50, i.e. the motion vector detector 50 outputs a signal of a structure corresponding to the decided mode to the estimation mode switcher 52 and the estimation mode switcher 52 then outputs this signal to the following stage computation part 53 without modification.

In the case of frame estimation mode, as shown in FIG. 7A, the color difference signal is provided to the computation part 53 with the line data for odd fields and the line data for even fields in a mixed state. Further, in the case of field estimation mode, as shown in FIG. 7B, the upper half (four lines) of each of the color difference blocks Cb and Cr are taken as the color difference signal for odd fields corresponding to the luminance blocks Y[1] and Y[2]. The lower half (four lines) is then taken as the color difference signal for even fields corresponding to the luminance blocks Y[3] and Y[4].

Moreover, the motion vector detector 50 generates an absolute value sum for the estimation error in order to decide which estimation of the estimation within the picture, the forward estimation, the backward estimation and the bi-directional estimation is carried out at the estimation discriminator 54 in the following way.

The difference between the absolute value |ΣAij| of the sum of the signal Aij for the macro block of the reference picture (where (i, j) are the coordinates of the pixels comprising the macro blocks) and the sum Σ|Aij| of the absolute value of the signal Aij for the macro block is obtained as the absolute value sum of the estimation error for estimation within the picture. Further, the sum Σ|Aij−Bij| of the absolute value |Aij−Bij| for the difference Aij−Bij of the macro block signal Aij for the reference picture and the estimation picture macro block signal Bij is obtained as the absolute value sum of the estimation error for forward estimation. The absolute value of the estimation error for the backward estimation and bi-directional estimation estimation errors is also obtained in the same way as for forward estimation (the estimation picture is converted to an estimation picture differing from the case of forward estimation).

This absolute value sum (the absolute value sum of the remaining difference ME) is provided to the estimation discriminator 54. The estimation discriminator 54 selects the smallest of the absolute value sums for the estimation errors in the forward estimation, backward estimation and bi-directional estimations as the absolute value sum of the estimation error for the inter-estimation. Moreover, the absolute value sum of the estimation error for this inter estimation and the absolute value sum for the estimation error of the estimation within the image are compared and the smaller value selected. The mode corresponding to this selected absolute value is then selected as the estimation mode. Namely, if the absolute value sum of the estimation error for the estimation within the picture is smaller, the estimation mode within the picture is set. If the absolute value sum of the estimation error for the inter estimation is smaller, the mode of the forward estimation, backward estimation and bidirectional estimation modes for which the corresponding absolute value sum is the smallest is set-up.

In this way, the motion vector detector 50, configured in frame estimation mode of field estimation mode so as to correspond to the mode s elected by the estimation mode switcher 52, provides the reference picture macro block signal to the computation part 53 via the estimation mode switcher 52. The motion vector detector 50 also detects the motion vector between the estimation picture corresponding to the estimation mode selected from the four estimation modes by the estimation discriminator 54 and the reference picture and outputs this motion vector to the variable length encoder 58 and the motion compensator 64. As described above, the motion vector corresponding to the smallest estimation error absolute value sum is selected as this estimation error.

When the motion vector detector 50 is reading picture data for an I picture from the forward source picture part 51a, the estimation discriminator 54 selects the estimation mode within a frame (picture) (the mode where motion compensation is not carried out) as the estimation mode and switches a switch 53d of the computation part 53 over to a connection point "a". In this way I picture picture data is inputted to a DCT mode switcher 55.

This DCT mode switcher 55 then outputs four luminance blocks of data to a DCT circuit 56 in one of either a state where odd field (first field) lines and even field (second field) lines are mixed or in a state (frame DCT mode) where odd and ever fields are separated (field DCT mode), as shown in FIG. 8A and FIG. 8B.

Namely, the DCT mode switcher 55 compares the encoding efficiency when data for odd and even fields is mixed and DCT processing is carried out and the encoding efficiency for when divided and selects the mode with the better encoding efficiency.

For example, as shown in FIG. 8A, the input signal is configured with odd fields and even fields lines mixed. The difference between up and down neighboring odd field line signals and even field line signals is calculated and an absolute value sum (or a squared sum) is obtained. When the inputted signal is configured with odd field and even field lines divided, as shown in FIG. 8B, the differences between fellow up and down neighboring odd field line signals and the differences between fellow even field line signals is calculated and the respective absolute value sums (or squared sums) are obtained. The respective absolute value sums are then compared and the DCT mode corresponding to the smallest value is set-up, i.e. if the former is smaller, frame DCT mode is set-up, and if the latter is smaller, field DCT mode is set-up.

Data of the configuration corresponding to the selected DCT mode is outputted to the DCT circuit 56 and a flag indicating the selected DCT mode is outputted to the variable length encoder 58 and a DCT block line substituter 65.

As becomes clear from comparing the estimation mode (FIG. 7A, B) at the estimation mode switcher 52 and the DCT mode (FIG. 8A, B) at this DCT mode switcher 55, the data structure occurring in each of the modes is practically the same with regards to the luminance block.

At the estimation mode switcher 52, when frame estimation mode (the mode where odd lines and even lines are mixed) is selected the possibility of selection of frame DCT mode (the mode where odd lines and even lines are mixed) is high even at the DCT mode switcher 55. Further, at the estimation mode switcher 52, when the field estimation mode (the mode where data for odd fields and even fields is divided) is selected, the possibility of the field DCT mode being selected (the mode where data for odd fields and even fields is separated) at the DCT mode switcher 55 is high.

This is, however, not always the case. The mode is decided at the estimation mode switcher 52 so that the absolute value sum of the estimation error becomes small, with the mode being decided at the DCT mode switcher 55 so that the encoding efficiency is good.

I picture picture data outputted from the DCT mode switcher 55 is inputted to the DCT circuit 56, DCT (discreet cosine transform) processed and transformed by a DCT coefficient. This DCT coefficient is inputted to a quantizer 57, quantized in quantization steps corresponding to the amount of data accumulated (buffer accumulation amount) at a transmission buffer 59, and inputted to the variable length encoder 58.

The variable length encoder 58 converts picture data (in this case, I picture data) into variable length code such as Hoffman code in such a manner as to correspond to quantization steps (scales) provided from the quantizer 57.

Quantization steps from the quantizer 57 (scales), estimation modes from the estimation discriminator 54 (a mode showing setting of one of estimation within picture, forward estimation, backward estimation, or bi-directional estimation), motion vectors from the motion vector detector 50, estimation flags from the estimation mode switcher 52 (flags showing the setting of one of frame estimation mode or field estimation mode), and DCT flags outputted by the DOT mode switcher 55 (flags showing the setting of one of either frame DcoT mode or field DT mode) are inputted to the variable length encoder 58 and then variable length encoded.

A transmission buffer 59 stores the inputted data once and outputs data corresponding to the stored amount to the quantizer 57.

When the volume of remaining data increases up to the allowable upper limit, the transmission buffer 59 makes the quantization schedule for the quantizer 57 larger using a quantization control signal (buffer feedback) so as to lower the amount of quantization data. On the contrary, when the amount of remaining data is reduced as far as the permissible lower limit, the transmission buffer 59 makes the quantization scale of the quantizer 57 small using a quantization control signal so as to increase the amount of quantized data. This prevents overflowing or underflowing of the transmission buffer 59.

Data stored at the transmission buffer 59 is read-out at a prescribed timing, outputted to the transmission path and, for example, recorded on the recording medium 3 shown in FIG. 4.

On the other hand, I picture data outputted from the quantizer 57 is inputted to an de-quantizer 60 and dequantized so as to correspond to the quantization steps provided by the quantizer 57. The output of the de-quantizer 60 is inputted to the an IDCT (inverse DCT) 61 and inverse DCT processed. The lines of data are then returned to the original form at a DCT block line replacer 65 so as to correspond to DCT flags from the DCT mode switcher 55. The data is then provided to a forward estimation picture part 63*a* of the frame memory 63 via a computation part 62.

When picture data for each of the frames inputted sequentially is, for example, processed as I, B, P, B, P, B . . . pictures, the motion vector detector 50 processes picture data for the frame inputted first as an I picture. Then, before processing the picture for the frame inputted next as a B picture, the picture data for a further subsequently inputted frame is processed as a P picture.

If a P picture is not prepared beforehand as the forward estimation picture, the B picture cannot be decoded because of the forward estimation accompanying B pictures. The motion vector detector 50 therefore stars processing picture data for the P picture stored in the backward source picture part 51*c* after processing the I picture. Then, as in the above case, the absolute value sum of the difference (estimation error) between frames is provided from the motion vector detector 50 to the estimation mode switcher 52 and the estimation discriminator 54 in macroblock units. The estimation mode switcher 52 and the estimation discriminator 54 then set the frame/field estimation mode, estimation within picture, forward estimation, backward estimation or bi-directional estimation mode so as to correspond to the absolute value sum of the estimation error for these P picture macro blocks.

When the estimation mode within a frame is set, the computation part 53 switches the switch 53*d* over to the side of connection point a in the way describe above. This data is then outputted via the DCT mode switcher 55, the DCT circuit 56, the quantizer 57, the variable length encoder 58 and the transmission buffer 59 in the same way as for the I picture data. This data is then provided to a backward estimation picture part 63*b* of the frame memory 63 via the de-quantizer 60, the IDCT 61, the DCT block line replacer 65 and the computation part 62 and stored.

During forward estimation mode, the switch 53*d* is switched over to connection point b, the picture (in the current case the I picture picture) stored in the forward estimation picture part 63*a* of the frame memory 63 is read and motion compensated by the motion compensator 64 in accordance with the motion vector outputted from the motion vector detector 50. Namely, when a forward estimation mode instruction is given by the estimation discriminator 54, the motion compensator 64 shifts the read address of the forward estimation picture part 63*a* from the position corresponding to the position of the macroblock currently being outputted by the motion vector detector 50 by an amount corresponding to the motion vector, reads out the data, and generates estimation picture data.

Estimation picture data outputted by the motion compensator 64 is provided to a calculator 53*a*. The calculator 53*a* hen subtracts estimation picture data corresponding to macroblocks provided by the motion compensator 64 from data for these reference picture macroblocks provided by the estimation mode switcher 52 and outputs data for the difference (estimation error). This difference data is outputted via the DCT mode switcher 55, the DCT circuit 56, the quantizer 57, the variable length encoder 58 and the transmission buffer 59. This difference data is then locally decoded by the de-quantizer 60, IDCT 61 and the DCT block line replacer 65 and inputted to the calculator 62.

Data the same as the estimation picture data provided to the calculator 53*a* from the motion compensator 64 is also provided to the calculator 62. In this way, the calculator 62 adds the estimation picture data outputted by the motion compensator 64 to the difference data outputted by the DCT block line replacer 65 and the original (decoded) P picture picture data is obtained. This P picture picture data is then provided to the backward estimation picture part 63*b* of the frame memory 63 and stored.

The motion vector detector 50 executes the processing for the next B picture after storing data for the I picture and the P picture in the forward estimation picture part 63*a* and the backward estimation picture part 63*b*. The estimation mode switcher 52 and the estimation discriminator 54 set the frame/field mode to correspond to the magnitude of the absolute value sum of the difference between the frames in macroblock units and set the estimation mode to be one of either the estimation within a frame mode, forward estimation mode, backward estimation mode or bi-directional estimation mode.

As described above, during the estimation within a frame mode or the forward estimation mode, the switch 53*d* is switched over to connection point a or the connection point b accordingly. At this time, processing is carried out in the same way as the case for P pictures and the data is outputted.

With regards to this, when the backward estimation mode or the bidirectional estimation mode is set, the switch 53*d* can be switched over to connection point c or d, respectively.

When the switch 53*d* is switched over to connection point c in backward mode, data for the picture (in the current case, a P picture picture) stored in the backward estimation picture part 63*b* is read-out and motion compensation corresponding to the motion vector to be outputted by the motion vector detector 50 is carried out by the motion compensator 64. Namely, when a backward estimation mode setting instruction is given by the estimation discriminator 54, the motion compensator 64 shifts the read address for the backward estimation picture part 63*b* from the position corresponding to the macroblock position currently being outputted by the motion vector detector 50 by an amount corresponding to the motion vector, reads the data, and generates estimation picture data.

Estimation picture data outputted by the motion compensator 64 is provided to a calculator 53*b*. The calculator 53*b* then subtracts estimation picture data supplied by the motion compensator 64 from the reference picture macroblock data provided from the estimation mode switcher 52 and outputs the difference. This difference data is then outputted via the DCT mode switcher 55, the DCT circuit 56, the quantizer 57, the variable length encoder 58 and the transmission buffer 59.

When the switch 53*d* is switched over to connection point d in bi-directional estimation mode, both the picture (in this case, I picture picture) data stored in the forward estimation picture part 63*a* and the data for the picture (in this case, a P picture picture) stored in the backward estimation picture part 63*b* is read-out a motion compensation corresponding to the motion vector outputted by the motion vector detector 50 is carried out by the motion compensator 64. Namely, when a bi-directional estimation mode setting instruction is given by the estimation discriminator 54, the motion compensator 64 shifts the read addresses at the forward estimation picture part 63*a* and the backward estimation picture part 63*b* from positions corresponding to the macroblock positions currently being outputted by the motion vector detector 50 by an amount corresponding to the motion vectors (in this case there are two motion vectors, one for forward estimation picture use and one for backward estimation picture use), reads the data, and generates estimation picture data.

Estimation data outputted from the motion compensator 64 is supplied to a calculator 53*c*. The calculator 53*c* then subtracts the average value of the estimation picture data supplied by the motion compensator 64 from the macroblock data for the reference image provided by the motion vector detector 50 and outputs the difference. This difference data is then outputted via the DCT mode switcher 55, the DCT circuit 56, the quantizer 57, the variable length encoder 58 and the transmission buffer 59.

The picture for the B picture is not stored in the frame memory 63 so that this B picture is not taken as the picture for other estimation pictures.

At the frame memory 63, the forward estimation picture part 63*a* and the backward estimation picture part 63*b* can be bank switched as necessary and that stored in one or the other can be switched over and outputted as the forward estimation picture or the backward estimation picture with respect to a prescribed reference picture.

In the above, a description is given centered about the luminance block, but processing can also be carried out taking the macro blocks shown in FIG. 7A and FIG. 7B, and FIG. 8A and FIG. 8B as units in the same way for color difference blocks. The motion vectors used for the case of processing color difference blocks are half of the corresponding luminance block motion vectors in the vertical direction and the horizontal direction.

Next, a description is given of the operation of the decoder 31 of FIG. 4. FIG. 9 is a block diagram showing an example of the configuration of the decoder 31 of FIG. 4. Encoded picture data transmitted via the transmission path 3 of FIG. 4 or recorded on the recording medium 3 is received by a receiving circuit not shown in the drawings or played-back by a playback device, stored once at a signal receiving buffer 81, and then supplied to a variable length decoder 82 of a decoder 90. The variable length decoder 82 variable length-decodes data supplied from the signal receiving buffer 81, outputs the motion vector, estimation mode and estimation flag to a motion compensator 87, and outputs the quantization step and the decoded picture data to an de-quantizer 83. The variable length decoder 82 also supplies a DCT flag to a DCT block line replacer 88.

The de-quantizer 83 de-quantizes picture data supplied from the variable length decoder 82 in accordance with the quantization steps supplied by the same variable length decoder 82 and outputs the results to and IDCT 84. Data (DCT coefficients) outputted from the de-quantizer 83 are inverse DCT processed at the IDCT circuit 84 and, at the DCT block line replacer 88, supplied to a calculator 85 after line replacement is carried out based on the DCT flag in the same way as in the case for the DCT block line replacer 65 of FIG. 5.

Picture data supplied from the DCT block line replacer 88 is, in the case of I picture data, outputted from the calculator 85 and then supplied to and stored in a forward estimation picture part 86*a* of the frame memory 86 for generating estimation picture data for the picture data (P or B picture data) to be inputted to the calculator 85 afterwards. This data is then outputted to the frame memory 33 of FIG. 4.

In the case of data for the forward estimation mode where the data is P picture data where picture data for one frame previous is taken as the estimation picture data, the picture data supplied by the DCT block line replacer 88 is stored in a forward estimation picture part 86*a* of the frame memory 86, the picture data (I picture data) for one frame previous is read out and motion compensation corresponding to the motion vector outputted from the variable length decoder 82 is carried out at the motion compensator 87. Then, at the calculator 85, this data is added with the picture data (difference data) supplied by the DCT block line replacer 88 and outputted. This added data, i.e. the decoded P picture data is then supplied to and stored in the backward estimation picture part 86*b* of the frame memory 86 in order to generate estimation picture data for the picture data (B picture or P picture data) inputted to the calculator 85 afterwards.

Even with P picture data, with data for the estimation mode within a picture, processing is not carried out at the calculator 85, in the same way as for I picture data, and the P picture data is stored in the backward estimation picture part 86*b* without modification.

This P picture is not outputted to the frame memory 33 of FIG. 4 at this time because this is a picture to be displayed after the next B picture (as described above, P pictures inputted after B pictures are to be processed before the B pictures and then transmitted).

When the picture data supplied from the DCT block line replacer 88 is B picture data, I picture picture data (in the case of forward estimation mode) stored in the forward estimation picture part 86*a* of the frame memory 86, P picture picture data (in the case of backward estimation mode) stored in the backward estimation picture part 86*b*, or both (in the case of bidirectional estimation mode) is/are read-out in accordance with the estimation mode supplied from the variable length decoder 82. Motion compensation corresponding to the motion vector outputted by the variable length decoder 82 is then performed at the motion compensator 87 and an estimation picture is generated. An estimation picture is not, however, generated when motion compensation is not necessary (in the case of the mode of estimation within a picture).

Data having undergone motion compensation at the motion compensator 87 is added with the output of the DCT block line replacer 88 at the calculator 85. This addition output is then outputted to the frame memory 33 shown in FIG. 4.

This addition output is, however, B picture data and is not stored in the frame memory 86 because this data cannot be used in estimation picture generation for other pictures.

After the B picture picture has been outputted, the P picture picture data stored in the backward estimation picture part 86b is read-out, supplied to the calculator 85 via the motion compensator 87 and outputted without modification to the frame memory 33 of FIG. 4.

At the decoder 31, although the circuit corresponding to the estimation mode switcher 52 of the encoder 17 of FIG. 5 is not shown in the drawings, the processes corresponding to this circuit i.e. the processes necessary for returning the divided configuration of odd field and even field line signals to the original mixed configuration are executed at the motion compensator 87 (carried out by the motion compensator 64 also at the encoder 17).

In the above, a description is given for the processing of a luminance signal but processing for a color difference signal could also be carried out in the same way. However, in this case, the motion vector used is reduced in the vertical and horizontal directions to half of that used for the luminance signal in the same way as the case for the encoder 17.

With related image signal encoding methods such as MPEG 2, by carrying out DCT transforms, information compression is carried out by allotting a large number of bits to signals having a large amount of electrical power (low frequency component) and signals having little electrical power (high frequency component) are allotted fewer bits.

However, the following problems occur in the related art because DCT transform processing is carried out on picture data divided into macroblocks of a fixed size.

(1) Block distortions.

(2) "Mosquito" noise.

The block distortions (1) occur when the encoding bit rate (number of bits allotted to the quantization) is not sufficient and phenomena can be observed at the boundaries of neighboring macroblocks. This is caused by dividing blocks of picture signal without considering continuity of signal between blocks.

(2) Mosquito noise is deterioration occurring in the vicinity of the edge of the blocks. This is caused by reflection distortions due to frequency component loss when blocks including edges are DCT transformed and encoded. When these kind of reflection distortions occur with these macroblocks, the whole of the macroblock deteriorates. Further, the decoded picture appears unnatural because the deterioration has no correlation with the direction of the time axis.

The influence of this deterioration can be alleviated by carrying out transform processing with a short tap number base. This corresponds to narrowing the range of the dispersion of the aforementioned reflection distortions. However, when transforms of a short tap number base are performed, the efficiency of the electrical power convergence becomes poor and the encoding efficiency deteriorates due to these transforms. There are also methods where the base tap number is changed for each frequency component, but changing the tap number is difficult when DCT transforms are used.

Further, wavelet transforms also exist for as transforms used for concentrating the signal power. In wavelet transforms, one type of filter bank disassembles each of the frequency components using filters (DCT can also be explained using one type of filter bank). FIG. 10 shows an example configuration for a system for encoding/decoding pictures using wavelet transforms. This system comprises two types of filter bank, a band-dividing filter bank and a band synthesis filter bank. The band-dividing filter bank comprises a low-pass filter that is a digital filter, a high-pass filter, and a down-sampling circuit. The band synthesis filter bank comprises an up-sampling circuit, a low-pass filter that is a digital filter and a high-pass filter, together with a synthesis circuit.

At the band-dividing filter band, the picture is filtered by a low-pass filter and a high-pass filter and the picture is then divided into M frequency bands (bands) by thinning out these outputs at down-sampling circuit. Further, with band synthesis filtering, the picture for each frequency band is interpolated by an up-sampling circuit and filtered using a low-pass filter and a high-pass filter. Further, the filtering results are then synthesized at the synthesis circuit and the original signal is decoded again. This method where an image signal is encoded/decoded using these band-dividing filter banks and band composite filter banks are is referred to as sub-band encoding/decoding.

Usually, a number of band-dividing filter banks (this is the same for band synthesis filter banks) are combined together in a tree-shaped structure. Wavelet transforms can be realized using these kinds of tree-shaped filter banks. A method where low-band components are successively band divided using lower-level filter banks after band-dividing at upper level filter banks has taken place is referred to as octave dividing.

For example, as shown in FIG. 11, when the picture is band-divided into four bands at the uppermost level filter bank, if the output of this filter bank is referred to as layer 0, and, in the case in FIG. 11, four bands of LL, LH, HL and HH exist at layer 0. According to octave dividing, the low-band component of layer 0 is further divided into 4 by the filter bank, with the low-band component obtained the previous time then being divided by just the number of times thereafter. The output obtained in the nth division is then referred to as the layer (n−1).

There is also the possibility that problems that could not be resolved using DCT transforms can now be resolved using new transform methods such as waveform transforms. However, it is well known that deterioration different from that in the case of DCT transforms known as ringing occurs when wavelet transforms are used (although ringing also occurs for substantially the same reason as mosquito noise (loss of high band component). How the wavelet transforms are to be applied to the time axis direction is also, however, a problem that is yet to be resolved.

The problem of how to encode the band-divided data obtained using wavelet transforms in an efficient manner is also yet to be resolved.

As the present invention sets out to resolve these kinds of problems, it is the object of the present invention to ease detriments such as block distortion and mosquito noise that could not be prevented in related moving picture encoding methods, to improve the encoding rate and encode pictures at a lower bit-rate.

SUMMARY OF THE INVENTION

According to a first aspect of the present invention, a picture encoding device comprises a divider and an encoder. The divider is for dividing picture data into encoding blocks of sizes corresponding to characteristics of the picture data. The encoder is for encoding the picture data using units of the encoding blocks.

Further, a picture encoding method comprises a dividing step and an encoding step. The dividing step divides picture data into encoding blocks of sizes corresponding to characteristics of the picture data. The encoding step encodes the picture data using units of the encoding blocks.

Moreover, a picture decoding device for dividing picture data into encoding blocks of sizes corresponding to characteristics of the picture data and decoding transmission data including at least encoded data encoded in the encoding block units, comprises a decoder. The decoder is for decoding the encoded data in the encoded block units.

Still further, a picture decoding method for dividing picture data into encoding blocks of sizes corresponding to characteristics of the picture data and decoding transmission data including at least encoded data encoded in the encoding block units comprising a decoding step. The decoding step decodes the encoded data in the encoded block units.

A recording medium is characterized by picture data being divided into encoding blocks of sizes corresponding to characteristics of the picture data and encoded data being recorded encoded in units of the encoding blocks.

According to a second aspect of the present invention, a picture encoding device comprises a divider, a motion vector detector, an estimation picture generator, a difference picture generator and an encoder. The divider is for dividing picture data into motion compensation blocks of sizes corresponding to characteristics of the picture data. The motion vector detector is for detecting motion vectors of the picture data. The estimation picture generator is for generating an estimation picture for the picture data of the motion compensation blocks by carrying out motion compensation based on the motion vectors. The difference picture generator is for generating a difference picture by calculating a difference of the picture data and the estimation data. The encoder is for encoding the difference picture and the motion vectors.

Further, a picture encoding method comprises a picture dividing step, an estimation picture generating step, difference picture generating step and encoding step. The picture-dividing step is for dividing picture data into motion compensation blocks of sizes corresponding to characteristics of the picture data and detecting motion vectors for the picture data. The estimation picture generating step is for generating an estimation picture for the picture data of the motion compensation blocks by carrying out motion compensation based on the motion vectors. The difference picture generating step is for generating a difference picture by calculating a difference of the picture data and the estimation picture. The encoding step is for encoding the difference picture and the motion vector.

Moreover, a picture decoding device, for dividing picture data into motion compensation blocks of sizes corresponding to characteristics of the picture data and detecting motion vectors for the picture data, generating an estimation picture for the picture data of the motion compensation blocks by carrying out motion compensation based on the motion vectors, generating a difference picture by calculating a difference of the picture data and the estimation picture and decoding transmission data including at least encoded data encoded with the difference picture and the motion vector, comprises an estimation picture generator and a decoder. The estimation picture generator is for generating the estimation picture for the picture data for the motion compensation blocks by carrying out motion compensation based on the motion vectors. The decoder is for decoding the picture data by adding the estimation picture and the difference picture.

Still further, a picture decoding method, for dividing picture data into motion compensation blocks of sizes corresponding to characteristics of the picture data and detecting motion vectors for the picture data, generating an estimation picture for the picture data of the motion compensation blocks by carrying out motion compensation based on the motion vectors, generating a difference picture by calculating a difference of the picture data and the estimation picture and decoding transmission data including at least encoded data encoded with the difference picture and the motion vector, comprises a generating step and a decoding step. The generating step is for generating the estimation picture for the picture data for the motion compensation blocks by carrying out motion compensation based on the motion vectors. The decoding step is for decoding the picture data by adding the estimation picture and the difference picture.

Further, a recording medium can be characterized by dividing picture data into motion compensation blocks of sizes corresponding to characteristics of the picture data and detecting motion vectors for the picture data, generating an estimation picture for the picture data of the motion compensation blocks by carrying out motion compensation based on the motion vectors, generating a difference picture by calculating a difference of the picture data and the estimation picture, being recorded with encoded data encoded with the difference picture and the motion vector.

BRIEF DESCRIPTION OF THE DRAWINGS

FIG. 5 is a block diagram showing an example configuration of the encoder 17 of FIG. 4;

FIG. 6 is a view illustrating a related block-dividing method;

FIG. 7A and FIG. 7B are views illustrating the operation of the estimation mode switcher 52 of FIG. 5;

FIG. 8A and FIG. 8B are views illustrating the operation of the DCT mode switcher 55 of FIG. 5;

FIG. 9 is a block diagram showing an example configuration of the decoder 31 of FIG. 4;

FIG. 24A, FIG. 24B and FIG. 24C are views illustrating the method of calculating the address occurring at the write address generator 201 of FIG. 23;

FIG. 25 is a view showing the format of the sequence header occurring at the bitstream outputted by the encoder of FIG. 12;

FIG. 26A and FIG. 26B are views showing the format of wavelet_coefficients( ) of FIG. 25;

FIG. 27 is a view showing the format of the group of picture header occurring at the bitstream outputted by the encoder of FIG. 12;

FIG. 28 is a further view showing the format of the group of picture header occurring at the bitstream outputted by the encoder of FIG. 12;

FIG. 29 is another view showing the format of the group of picture header occurring at the bitstream outputted by the encoder of FIG. 12;

FIG. 30 is a view of the table for the macroblock type (macroblock_type) for a macroblock occurring at an I picture;

FIG. 31 is a view of the table for the macroblock type (macroblock_type) for a macroblock occurring at a P picture;

FIG. 32 is a view of the table for the macroblock type (macroblock_type) for a macroblock occurring at an B picture; and FIG. 33 is a view showing the format of motion vectors occurring at a bitstream outputted by the encoder of FIG. 12.

DETAILED DESCRIPTION OF THE PREFERRED EMBODIMENTS

First Embodiment

A description of an embodiment of the present invention is given in the following, but before this is given, a listing of the characteristics of the present invention will be given.

Figures 12, 12A:
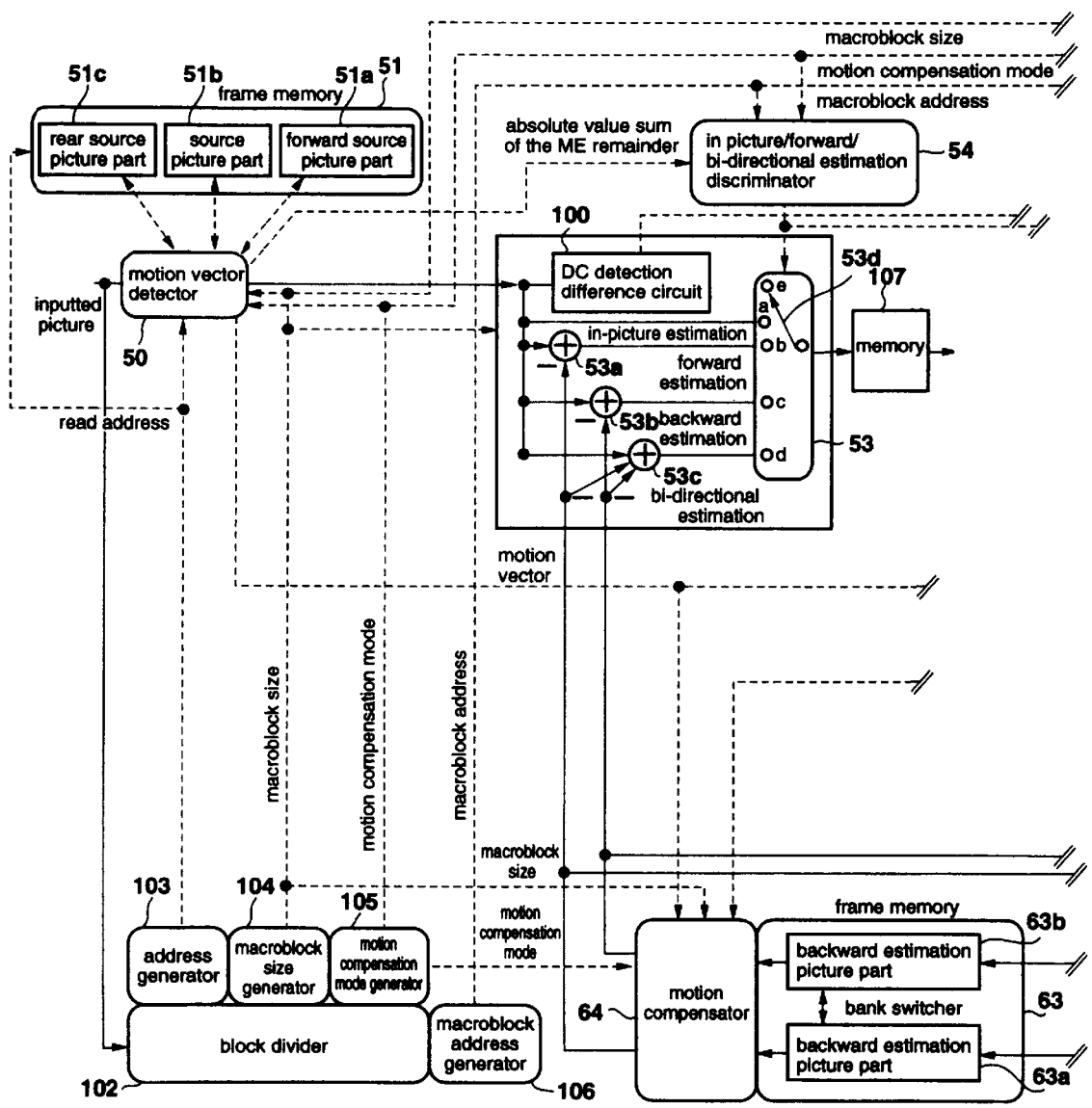
FIG. 12 is a block diagram showing the configuration of an embodiment of the present invention applied to an encoder.
Figures 12, 12B:
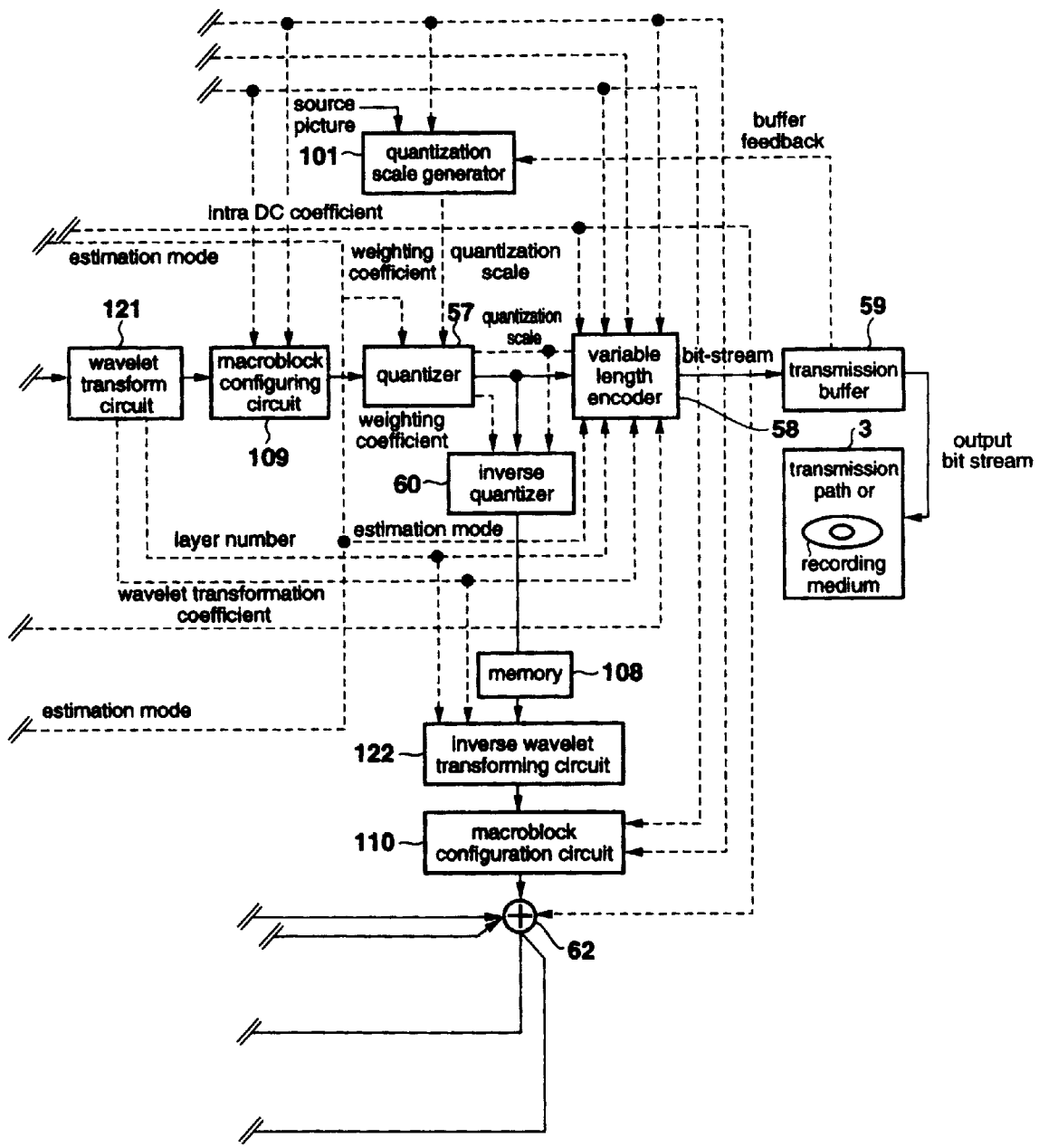

Namely, according to a first aspect of the present invention, a picture encoding device comprises dividing means (for example, the block divider 102 shown in FIG. 12) for dividing picture data into encoding blocks of sizes corresponding to characteristics of the picture data and encoding means (for example, the quantizer 57 and the variable length encoder 58 shown in FIG. 12) for encoding the picture data using units of the encoding blocks.

This device can further comprise transform means (for example, the wavelet transform circuit 121 shown in FIG. 12) for performing prescribed transform processing on the picture data using a plurality of the encoding block units and outputting transform coefficients, wherein the encoding means encodes the transform coefficients outputted by the transform means using the encoding block units.

Figure 17:
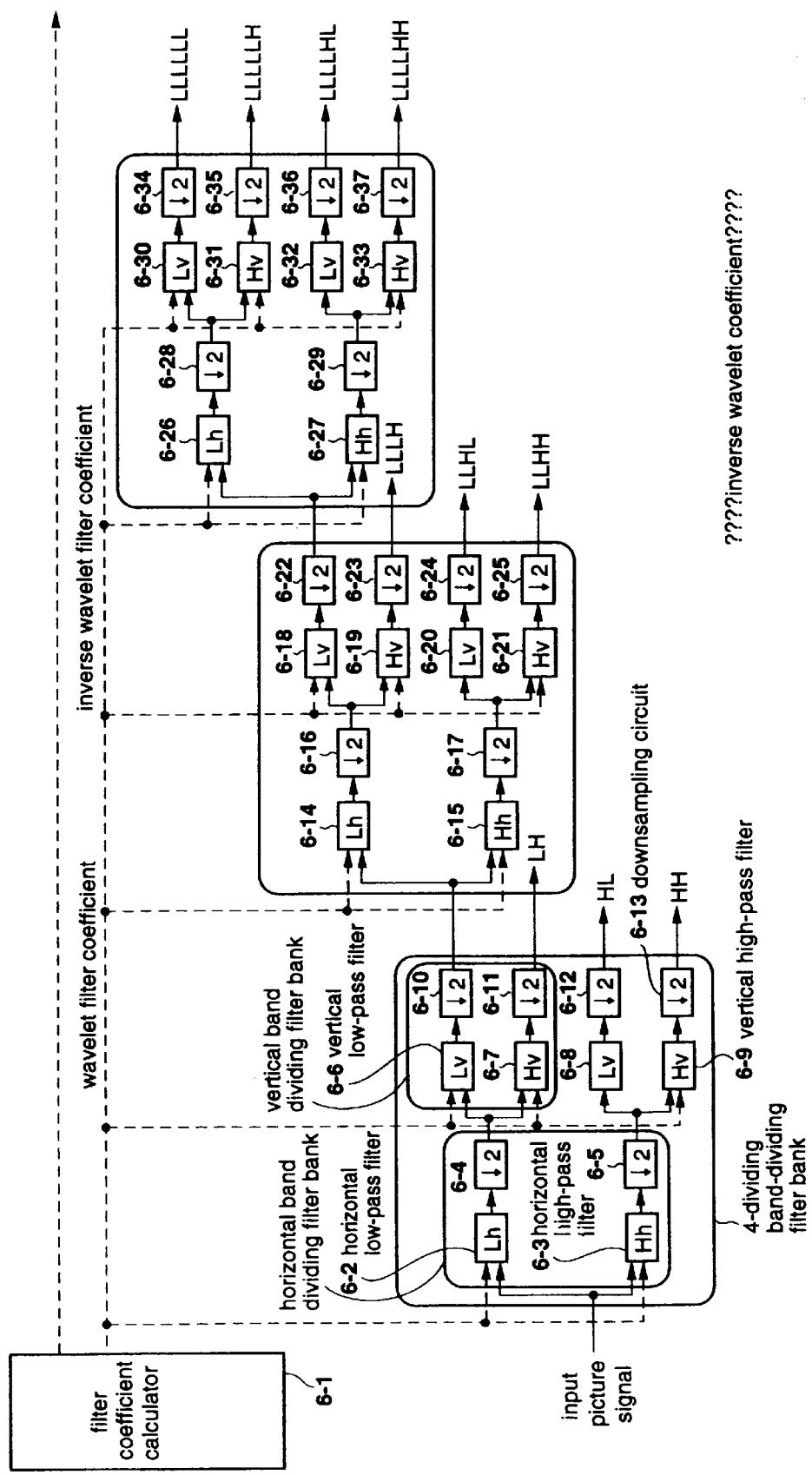
FIG. 17 is a block diagram showing an example configuration of the wavelet transform circuit 121 of FIG. 12.
Figure 18:
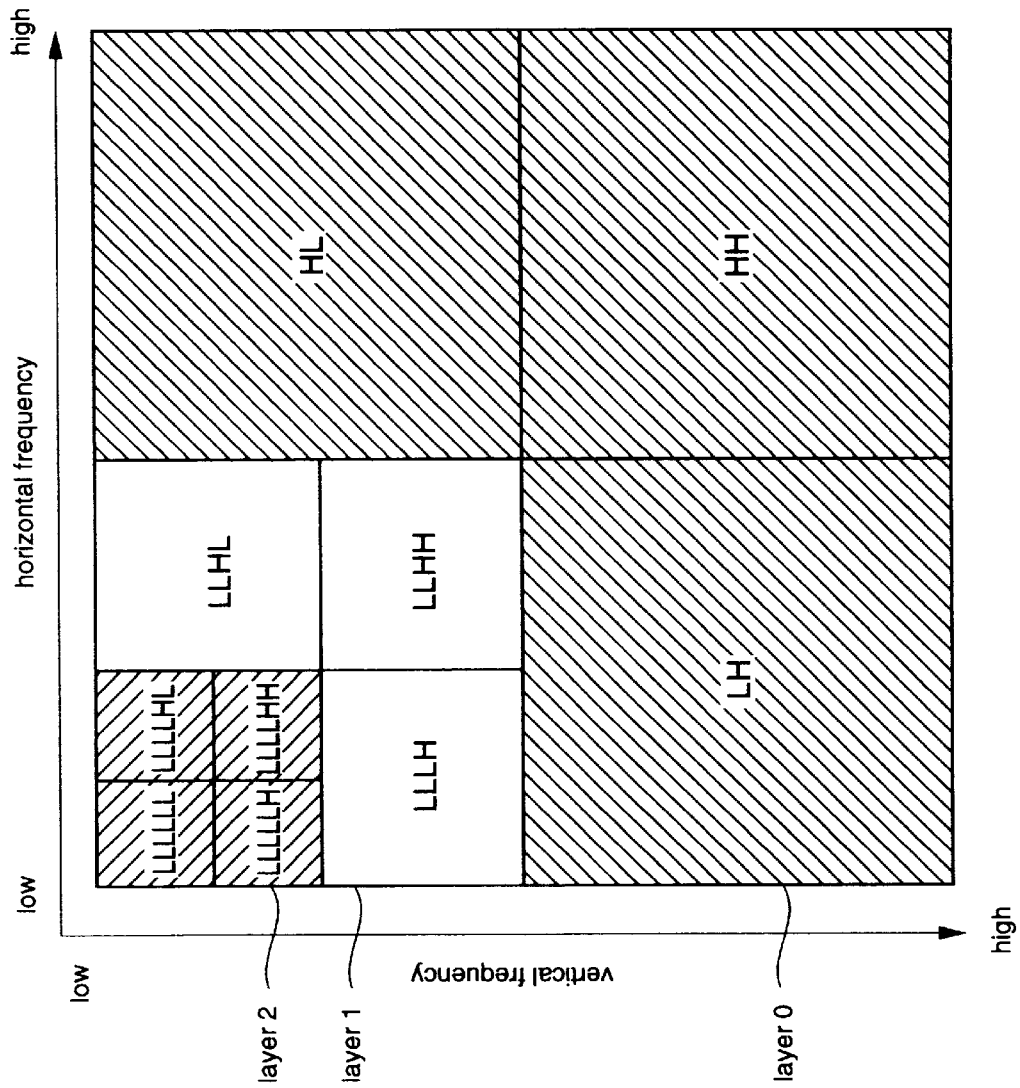
FIG. 18 is a view showing a picture band-divided by wavelet transforms.

Moreover, the transform means can comprise filtering means (for example, the horizontal low-pass filter 6-2 and horizontal high-pass filter 6-3 shown in FIG. 17, the vertical low-pass filters 6-6 and 6-7, and the vertical high-pass filters 6-8 and 6-9) for filtering the picture data, thinning-out means (for example, the downsampling circuits 6-4, 6-5, and 6-10 to 6-13 shown in FIG. 17) for thinning-out an output of the filtering means and setting means (for example, the filter coefficient calculating circuit 6-1 shown in FIG. 17) for setting filtering coefficients for filtering the picture data at the filtering means.

Still further, the encoding means comprises quantizing means (for example, the quantizer 57 shown in FIG. 12) for quantizing and outputting the transform coefficients and variable length encoding means (for example, the variable length encoder 58 shown in FIG. 12) for variable length encoding the quantization coefficients outputted by the quantizing means.

Figure 23:
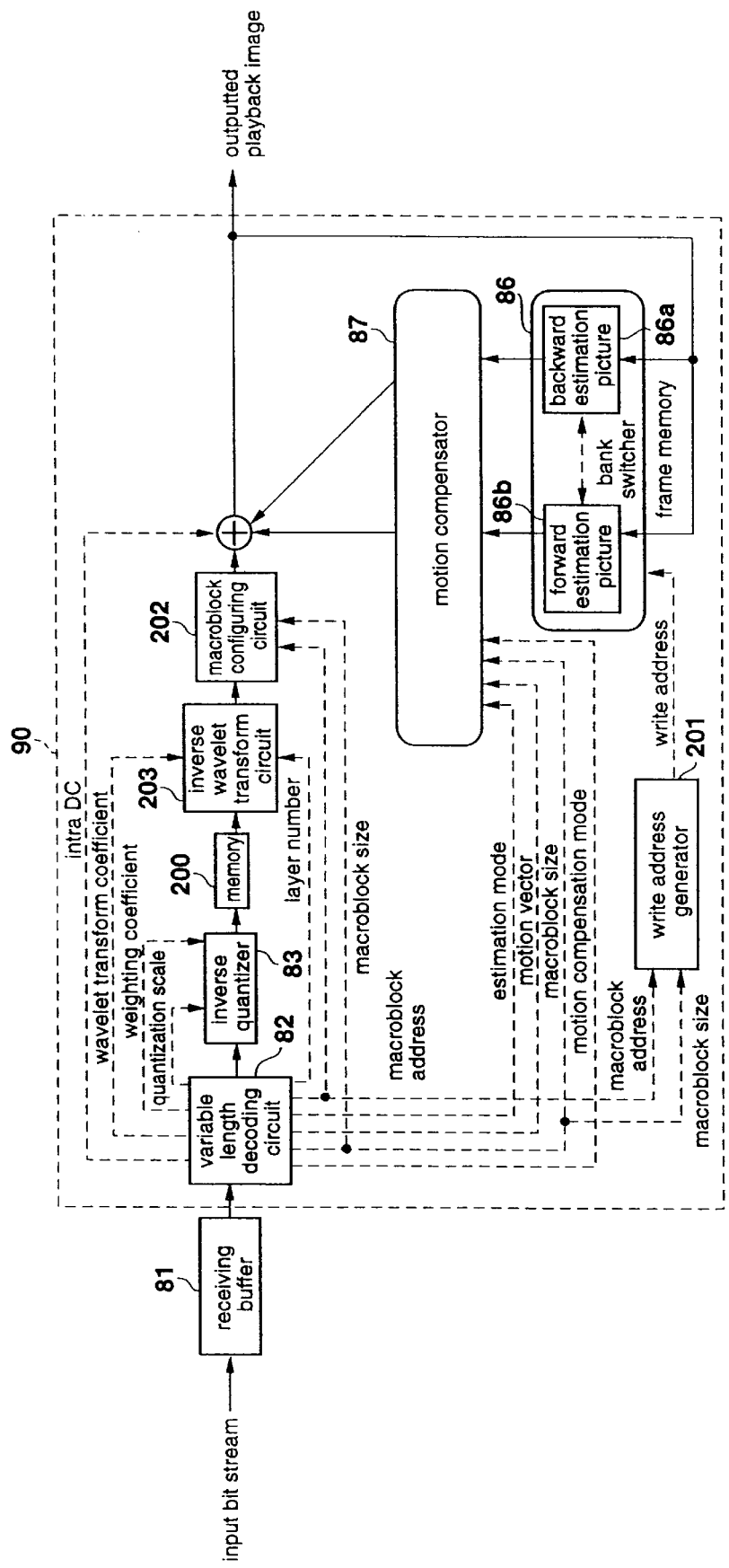
FIG. 23 is a block diagram showing an example configuration of the decoder to which the present invention is applied.

A picture decoding device according to this first aspect of the present invention for dividing picture data into encoding blocks of sizes corresponding to characteristics of the picture data and decoding transmission data including at least encoded data encoded in the encoding block units, comprises decoding means (for example, the variable length decoder 82 and the de-quantizer 83 shown in FIG. 23) for decoding the encoded data in the encoded block units.

Further, the encoded data is the transform coefficients, obtained by performing prescribed transformation processing on the picture data using a plurality of the encoding block units, encoded using the encoding blocks, the decoding means outputs the transform coefficients by decoding the encoded data, and the picture device is further equipped with inverse transform means (for example, the inverse wavelet transform circuit 203 shown in FIG. 12) for performing inverse transform processing that is the reverse of the transform processing on the transform coefficients using a plurality of the encoding block units.

According to a second aspect of the present invention, a picture encoding device comprises dividing means (for example, the block divider 102 shown in FIG. 12) for dividing picture data into motion compensation blocks of sizes corresponding to characteristics of the picture data, motion vector detecting means (for example, the motion vector detector 50 shown in FIG. 12) for detecting motion vectors of the picture data, estimation picture generating means (for example, the motion compensator 64 shown in FIG. 12) for generating an estimation picture for the picture data of the motion compensation blocks by carrying out motion compensation based on the motion vectors, difference picture generating means (for example, the computation part 53 shown in FIG. 12) for generating a difference picture by calculating a difference of the picture data and the estimation data and encoding means (for example, the DCT circuit 56 shown in FIG. 12) for encoding the difference picture and the motion vectors.

Moreover, this device can further comprises deciding means (for example, the in-picture/forward/bi-directional estimation discriminator 54 shown in FIG. 12) for deciding whether or not to encode the difference picture and mean value calculating means (for example, the DC difference detector 100 shown in FIG. 12) for calculating an mean value for the picture data of the encoded block, wherein the encoding means encodes the difference picture when the deciding means decides to encode the difference picture and encodes the value for a difference of the mean value for the recording data corresponding to the difference data and the picture data when the deciding means decides not to encode the difference picture.

This device can be further equipped with transformation means (for example, the wavelet transform circuit 121 shown in FIG. 12) for performing prescribed transformation processing on the difference picture and outputting transformation coefficients, wherein the encoding means encodes the transform coefficients.

A picture decoding device according to the second aspect of the present invention, for dividing picture data into motion compensation blocks of sizes corresponding to characteristics of the picture data and detecting motion vectors for the picture data, generating an estimation picture for the picture data of the motion compensation blocks by carrying out motion compensation based on the motion vectors, generating a difference picture by calculating a difference of the picture data and the estimation picture and decoding transmission data including at least encoded data encoded with the difference picture and the motion vector, comprises estimation picture generating means (for example, the motion compensator 87 shown in FIG. 23) for generating the estimation picture for the picture data for the motion compensation blocks by carrying out motion compensation based on the motion vectors and decoding means (for example, the calculator 85 shown in FIG. 23) for decoding the picture data by adding the estimation picture and the difference picture.

Further the transmission data can further include a mean value for the picture data for the encoded blocks, a difference value with this data, and the mean value and the picture decoding device can further comprise adding means (for example, the calculator 85 shown in FIG. 23) for adding the difference value and the mean value.

Moreover, prescribed transform processing can be carried out on the difference picture and the picture decoding device can be further equipped with inverse transform means (for example, the inverse wavelet transform circuit 203 shown in FIG. 23) for performing inverse transform processing inverse to the transform processing on the encoded data and outputting the difference picture.

Of course, this description by no means limits each of the means described above.

FIG. 12 shows the configuration of an embodiment of an embodiment of the present invention applied to an encoder. In FIG. 12, the basic structure is the same as the case in FIG. 5, with items that are the same being given the same numerals, with their descriptions being omitted when appropriate.

Figure 1:
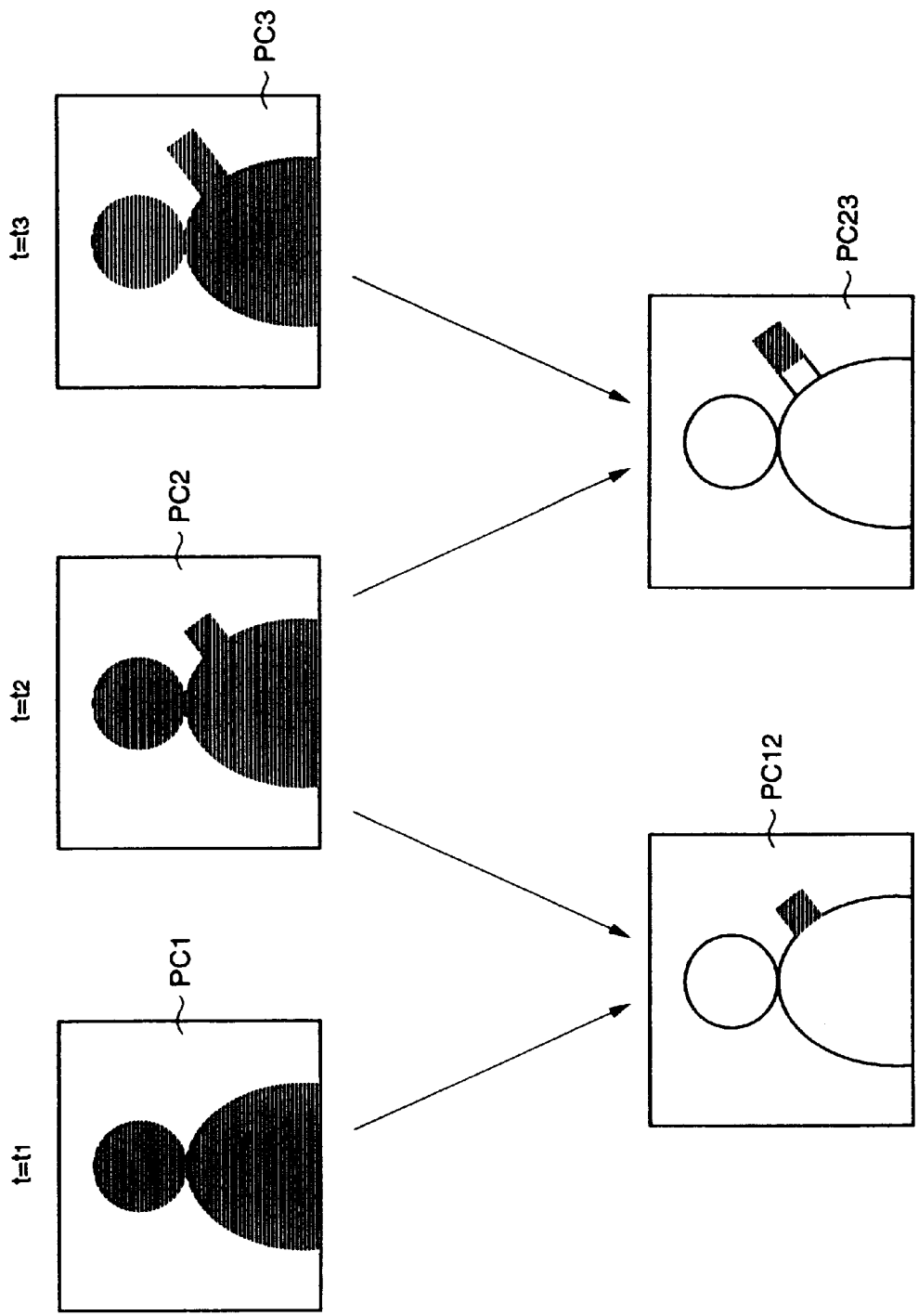
FIG. 1 is a view illustrating a theory for highly efficient coding.
Figure 2A:
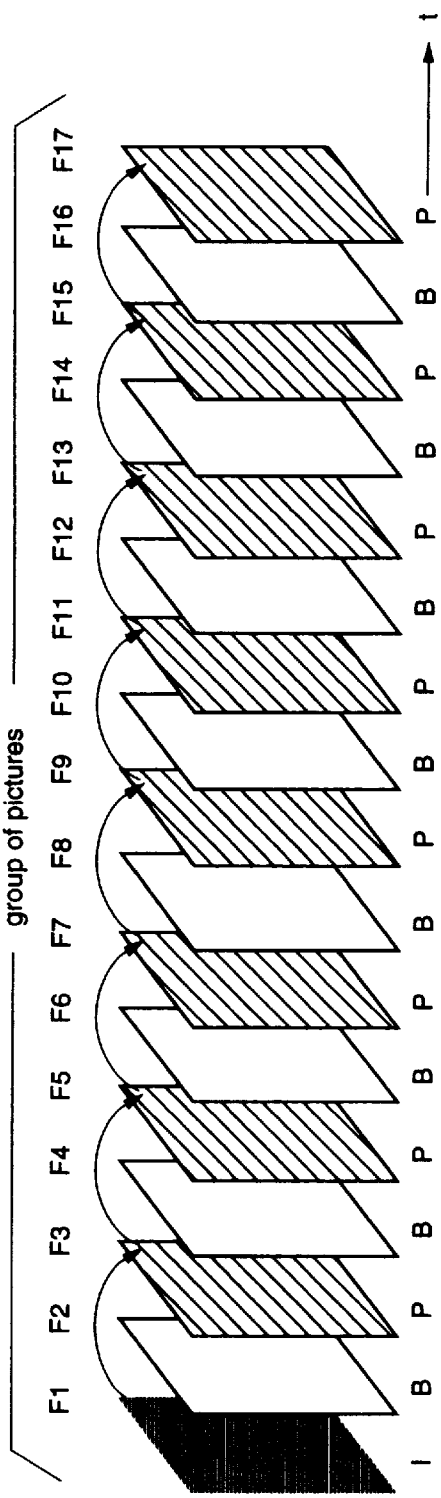
FIG. 2A and FIG. 2B are view illustrating picture types occurring when picture data is compressed.
Figure 2B:
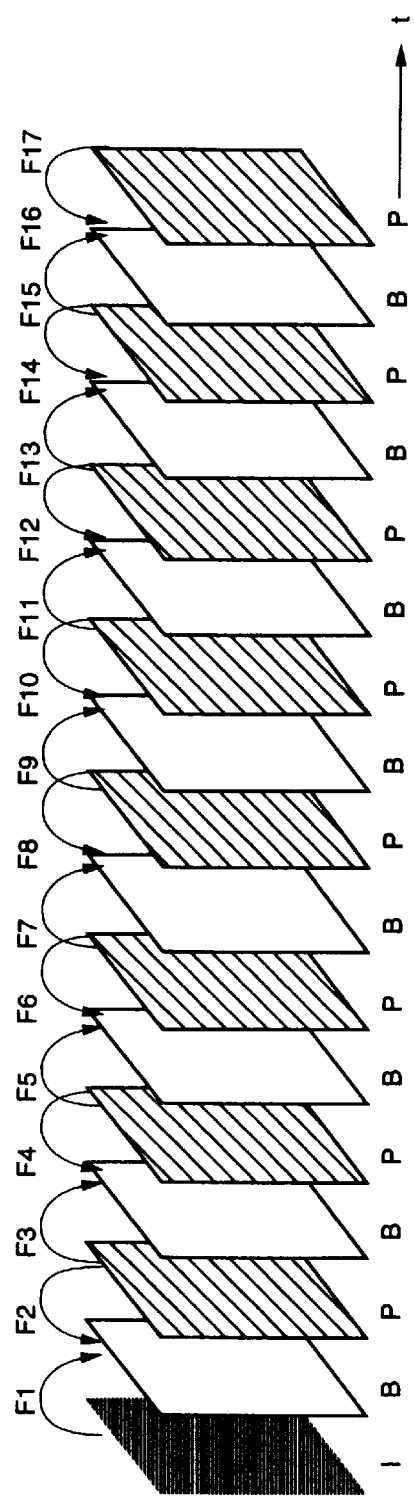
Figure 3:
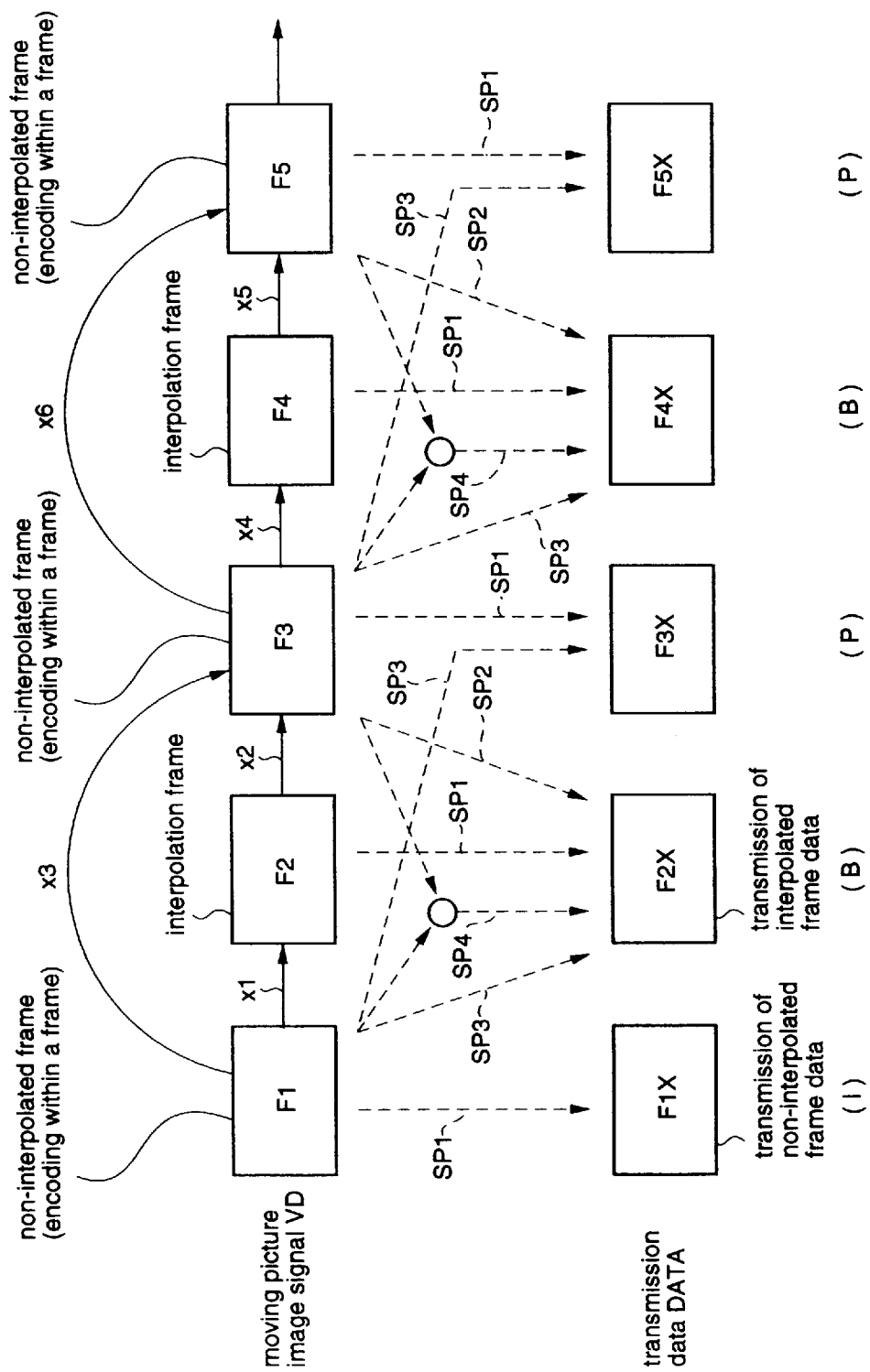
FIG. 3 is a view illustrating moving picture coding theory.
Figure 4:
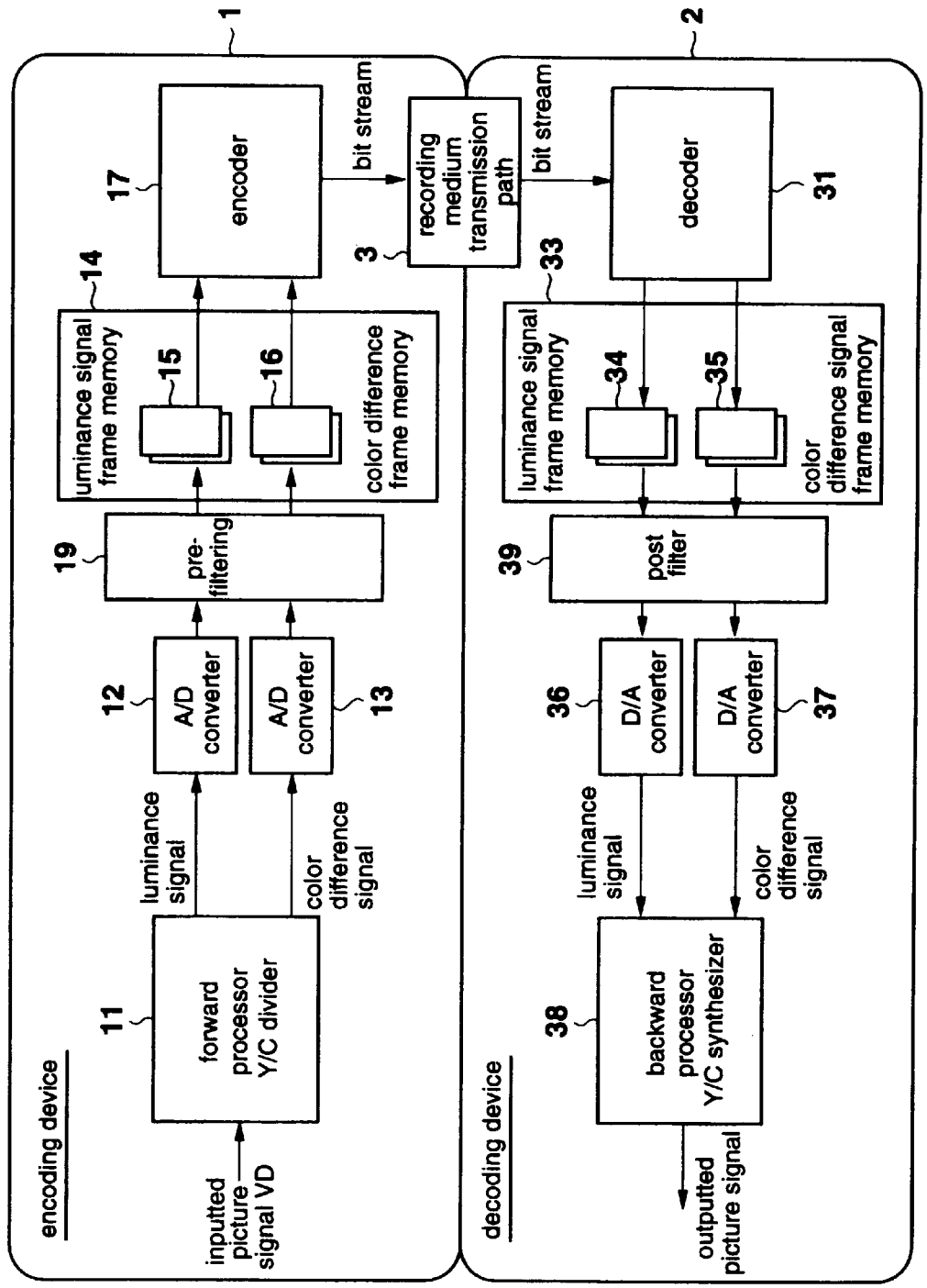
FIG. 4 is a block diagram showing an example configuration of a related moving picture encoding device and decoding device.
Figure 10:
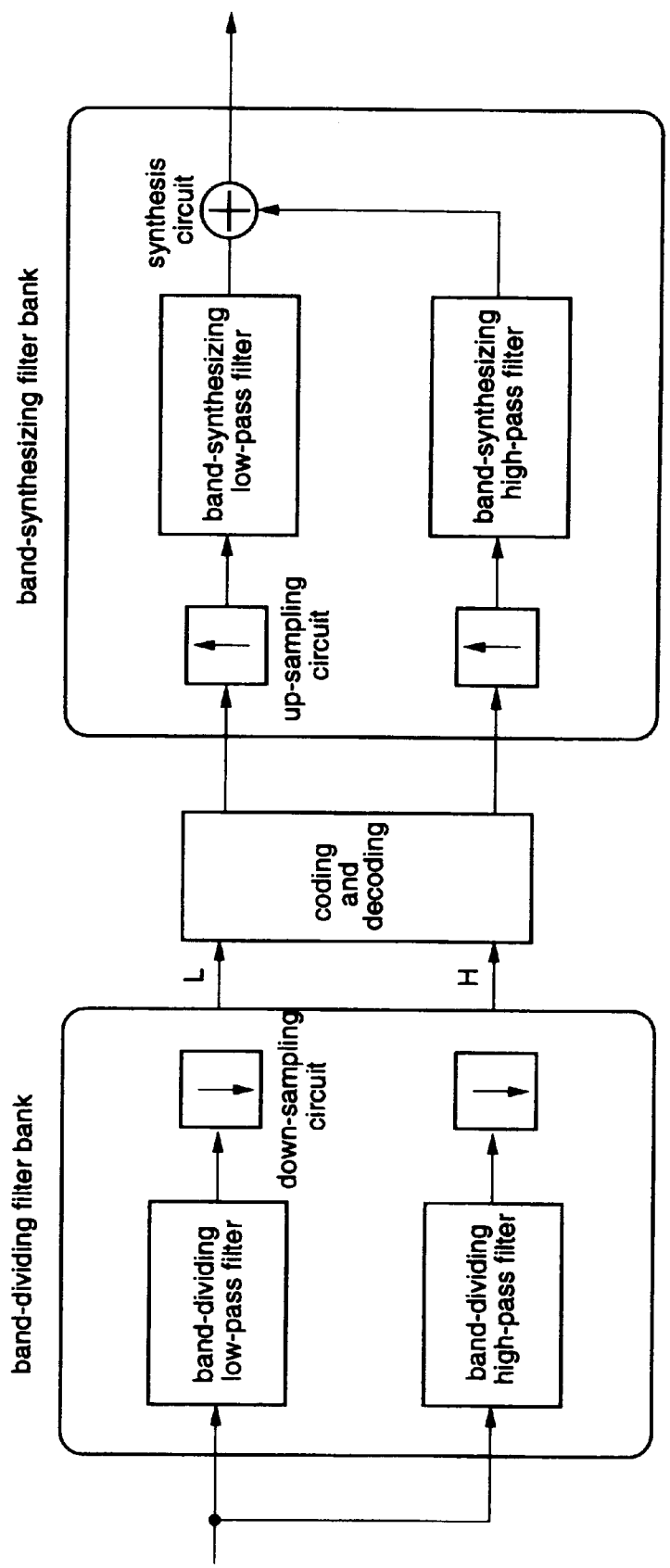
FIG. 10 is a block diagram illustrating sub-band encoding.
Figure 11:
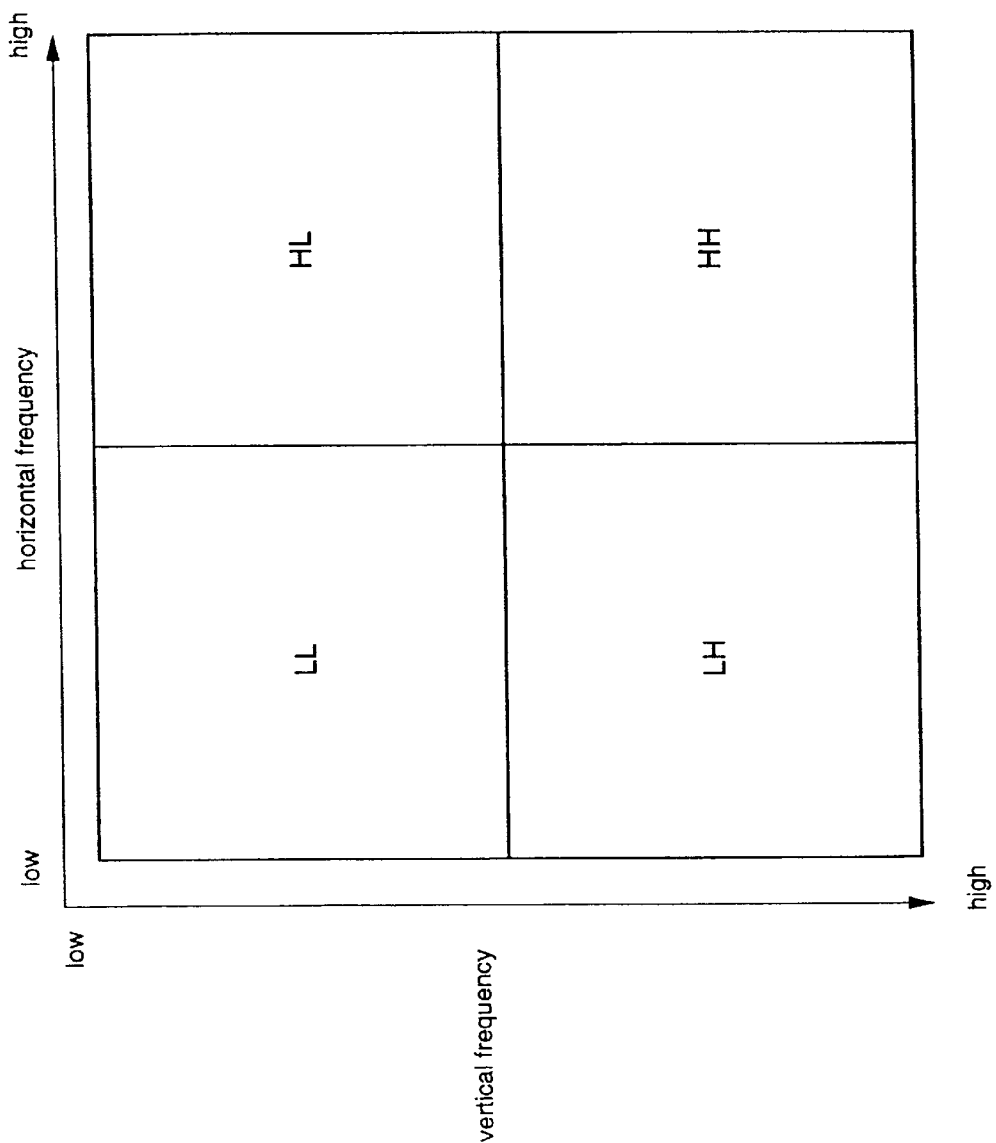
FIG. 11 is a view showing a picture band-divided into four frequency bands by wavelet transforms.

Picture data to be encoded is, for example, inputted to the motion vector detector 50 in the sequence described in FIG. 2A and B in the same way as the case in FIG. 5. Picture data inputted at the motion vector detector 50 is also, for example, transferred to the frame memory 51 in the same way as the case in FIG. 5.

Each of the picture signals stored in the frame memory 51 are then read-out and calculations for estimation within a picture, forward estimation, backward estimation or bidirectional estimation are carried out at the computation part 53, under control of the estimation discriminator 54.

One of these processes is then decided upon for execution in accordance with an estimation error signal (the difference between a reference picture taken as the processing target and a corresponding estimation picture). The motion vector detector 50 then generates an absolute value sum (or squared sum) for the estimation error signal using this determination.

The encoded picture data is then inputted to a block divider 102. The block divider 102 then divides the inputted picture signal into macroblocks of a magnitude corresponding to these characteristics (qualities). In the aforementioned MPEG2 method (as in the MPEG1 method), the macroblocks are of a fixed size of 16×16 pixels. However, in this embodiment, the magnitude of the macroblocks (coding blocks) is made to vary. Motion compensation units (motion compensation blocks) are also made to vary in a similar manner.

For example, in this embodiment, the following three types of settings are provided for the magnitude of the macroblock and motion compensation units.

type 1: macroblock magnitude . . . 32×32 pixels.

motion compensation units . . . 32×32 pixels type 2: macroblock magnitude . . . 16×16 pixels motion compensation units . . . 16×16 pixels type 3: macroblock magnitude . . . 16×16 pixels motion compensation units . . . 8×8 pixels.

One group (one group in the x direction and the y direction) of motion vectors exists in the type 1 and type 2 macroblocks with four groups of motion vectors existing in type 3 macroblocks.

Here, the configuration of the above three types of macroblocks (motion compensation units) is described with reference to FIG. 13A, B and C. Whatever the type the macroblock is, the macroblock will comprise four luminance blocks Y[1] to Y[4] and two color difference signal blocks Cb[5] and Cr[6]. As shown in FIG. 13A, each luminance block is 16×16 pixels, as are each of the color signal blocks. In this case, the motion compensation is carried out with the four luminance blocks grouped together as a single unit, i.e. one (group) motion vector is made to correspond to four luminance blocks. The same motion vectors can also be used for each of the color difference signals.

In the case of the type 2 macroblock shown in FIG. 13B, four luminance blocks are 8×8 pixels in size, as are each of the color difference signal blocks. In this case, the motion compensation is carried out with four luminance blocks gathered together as a single unit, i.e. one motion vector is made to correspond to four luminance blocks. The same motion vectors can also be used for each of the color difference signals.

In the case of the type 3 macroblocks shown in FIG. 13C, each of the luminance blocks are 8×8 pixels in size, as are the color difference signal blocks. Motion compensation is then carried out taking each luminance block as a single unit, i.e. each motion vector is made to correspond to four luminance blocks, with one macroblock being made to correspond to a total of four motion vectors. The 8×8 pixel blocks of the color signal are divided into 4×4 pixel subblocks, and motion vectors for the corresponding luminance blocks can be used for the subblocks (Cb[5-1] to Cb[5-4], and Cr[6-1] to Cr[6-4]), respectively. For example, the motion vector for Y[1] can be used for Cb[5-1] and Cr[6-1].

In this embodiment, a description was given using just three types, but the values of the units for the magnitude of the macroblocks and the motion compensation units are arbitrary.

The block divider 102 in FIG. 12 divides the inputted picture signal into one of three types in response to the qualities of the inputted picture signal. A description will now be given of the block dividing method occurring at the block divider 102. Various dividing methods can be considered but, for example, a different dividing method is used when the frame to be encoded is a frame encoded within a frame (an I picture) and when the frame to be encoded is other frames to be encoded between frames (P or B pictures).

Figure 14:
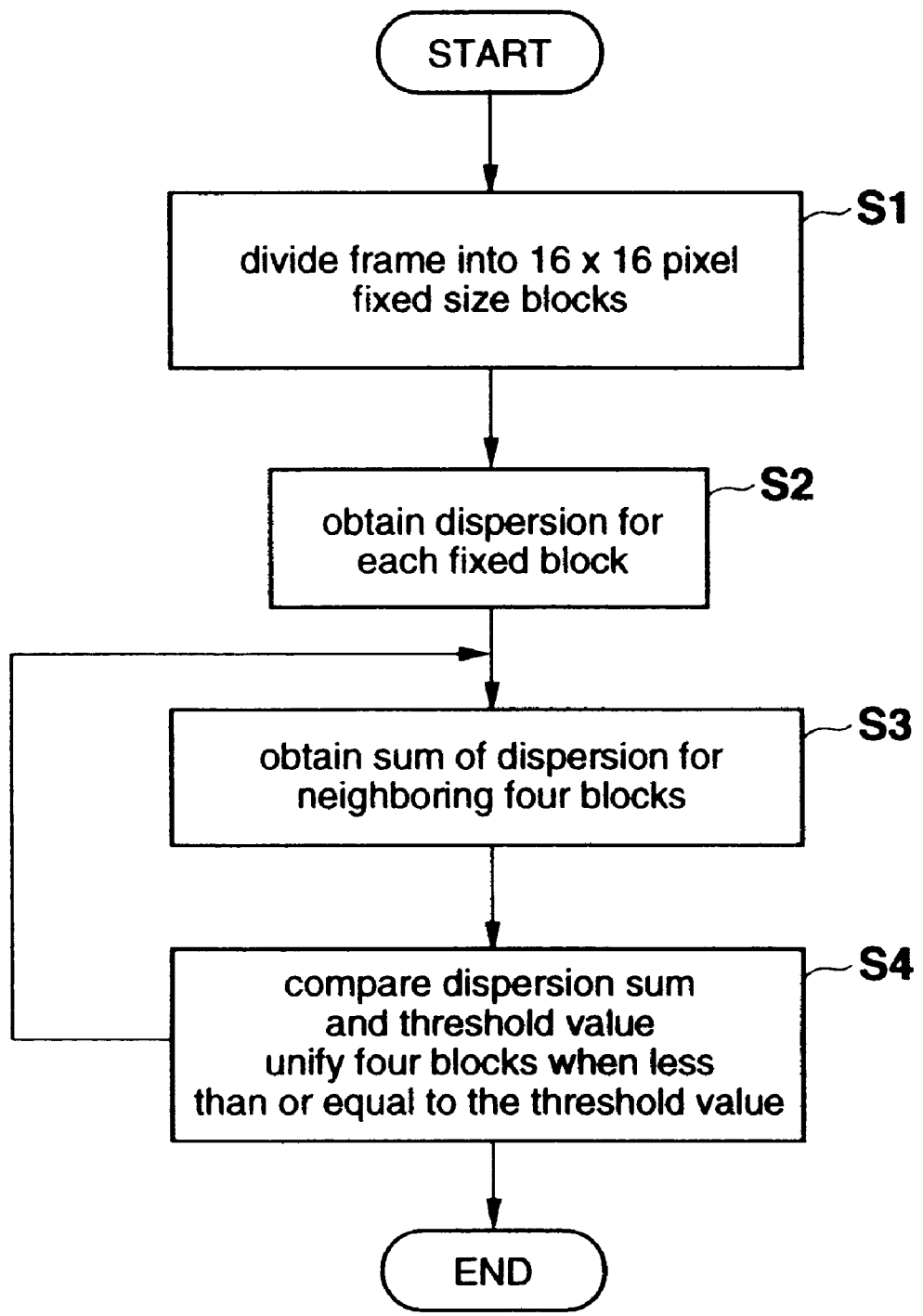
FIG. 14 is a flowchart illustrating the block-dividing method occurring at the block divider 102 of FIG. 12.

First, a description is given of the case of an I picture with reference to the flowchart of FIG. 14. As I pictures are encoded within a frame, dividing is carried out using the qualities of the inputted frame. Further, the I picture can be obtained using just the two paths of type 1 or type 2. Motion compensation is not carried out in the case of I pictures and the motion compensation units therefore bear no relationship to the processing. Type two and type three can therefore be handled as the same structure.

First, the whole of the inputted frame is, for example, divided into 16×16 pixel fixed size blocks (hereinafter referred to as "fixed blocks") (step S1). A physical amount expressing the qualities of the picture, for example, in this embodiment, the dispersion of each fixed block, is calculated for each of the 16×16 pixel blocks (step S2).

The dispersion sum for the four blocks of the noted fixed block and the neighboring three fixed blocks (for example, the neighboring fixed blocks to the right, below and to the lower right of the noted fixed block) is obtained (step S3) and when this value is equal to or less than a prescribed threshold value, these four fixed blocks including the noted fixed block are put together to give one 32×32 pixel macroblock (type 1 macroblock) (step S4). This unification processing (step S3 and step S4) is carried out for all of the fixed blocks within a frame using, for example, a so-called line scan sequence i.e. time sequentially from the upper left to the lower right of the frame. Fixed blocks that have already been unified are, however, ignored. Further, the unification process is not carried out when fixed blocks to be unified are already unified with other fixed blocks. Fixed blocks remaining after the unification processing is finished for all of the fixed blocks within the frame are taken to be 16×16 pixel macroblocks (type 2 macroblock).

Next, a description will be given with reference to the flowchart of FIG. 15 of the of the block dividing method for frame encoding between frames i.e. in the case of P pictures or B pictures. In frame encoding between frames, the signal difference between frames is encoded. Block dividing is therefore also carried out based on the qualities of the difference signal between frames. In the case of frame encoding between frames, dividing is also obtained with macroblocks for one of the aforementioned types 1, 2 or 3.

First, the whole of the input frames are divided into 32×32 pixel fixed size blocks (hereinafter referred to as "fixed blocks") (step S14). Motion vectors are then detected with this fixed block divided into four equal parts of blocks of 8×8 pixels. The absolute value sum of the estimation error (ME remainder) is then calculated (step S15).

At the same time, the whole of the inputted frame is divided into fixed blocks of 16×16 pixels (step S11), with motion vectors then being detected for each of these blocks, and the absolute value sum of this ME remainder is calculated (step S12).

The total of the absolute value sums for the noted fixed block and the neighboring three 16×16 pixel fixed blocks is obtained (step S13). When this total value is greater than the absolute value sum for the ME remainder for the corresponding 32×32 pixel block, the four 16×16 pixel blocks are unified and taken to be one 32×32 pixel macroblock (type 1 macroblock) (step S16). This unification process (step S16) can be carried out time-sequentially in the same way as, for example, the case of an I picture. Fixed blocks of 16×16 pixels remaining after the unification process of step S13 is completed for all of the 16×16 pixel fixed blocks within one frame are then taken as one 16×16 pixel macroblock.

In the case of encoding frames between frames, there are two types of 16×16 pixel macroblocks of type 2 and 3 shown in FIG. 13B and FIG. 13C. Each of the 16×16 pixel macroblocks is then decided as being one of either the type 2 or type 3 macroblocks.

First, the 16×16 pixel macroblocks are divided into four 8×8 pixel blocks (step S17). Motion vectors are then detected for each of the 8×8 pixel blocks and the absolute value sum of this ME remainder is calculated (step S18).

When the total of the sum for the ME remainder for the four 8×8 pixel blocks is smaller than the ME remainder for the corresponding 16×16 pixel macroblock, this macroblock is taken to be a type 3 macroblock (step S19). In this case the magnitude of the motion compensation units becomes 8×8 pixels. In other cases, the macroblock is taken to be a type 2 macroblock.

Figure 15:
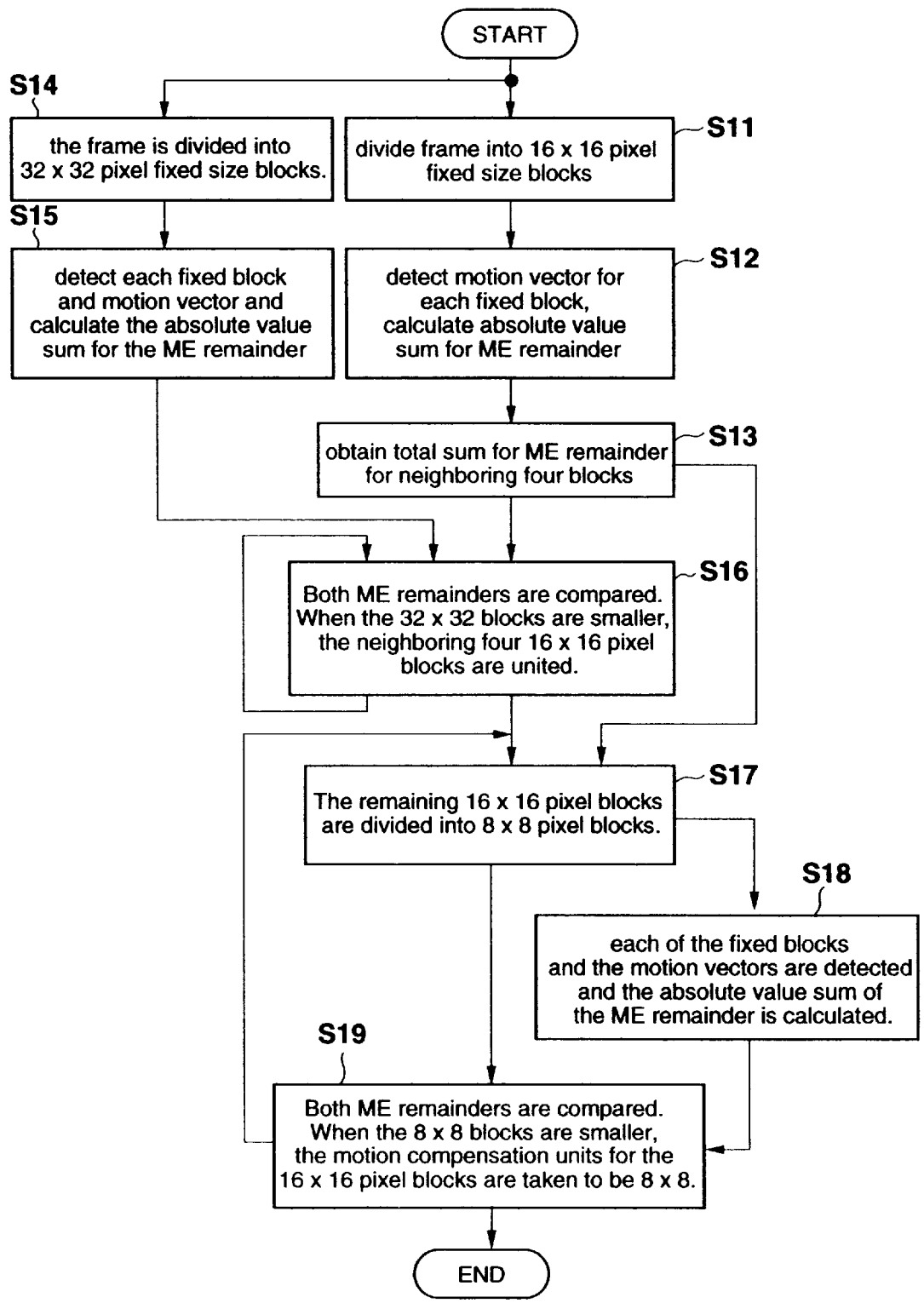
FIG. 15 is a flowchart illustrating the block dividing method occurring at the block divider 102 of FIG. 12.

The block dividing and motion vector detection in FIG. 14 and FIG. 15 is usually carried out only using a luminance signal but can also be carried out using a color difference signal.

The block divider 102 in FIG. 12 divides frames encoded in the above way into macroblocks of one of three types. In this dividing, all of the pixels of encoded frames are definitely included in a macroblock and pixels are not included in more than one macroblock.

Returning to FIG. 12, a macroblock address generator 106 generates a macroblock address mb_address for the macroblock to be encoded. In this embodiment, the upper-leftmost macroblock of the frame is taken as, for example, 1, and are then numbered in consecutive increases of on in the order of coding (i.e. for example, in the line scan order).

A description will now be given using FIG. 16 regarding the macroblock address allotting method (the method of deciding the order of encoding each of the macroblocks).

Figure 16:
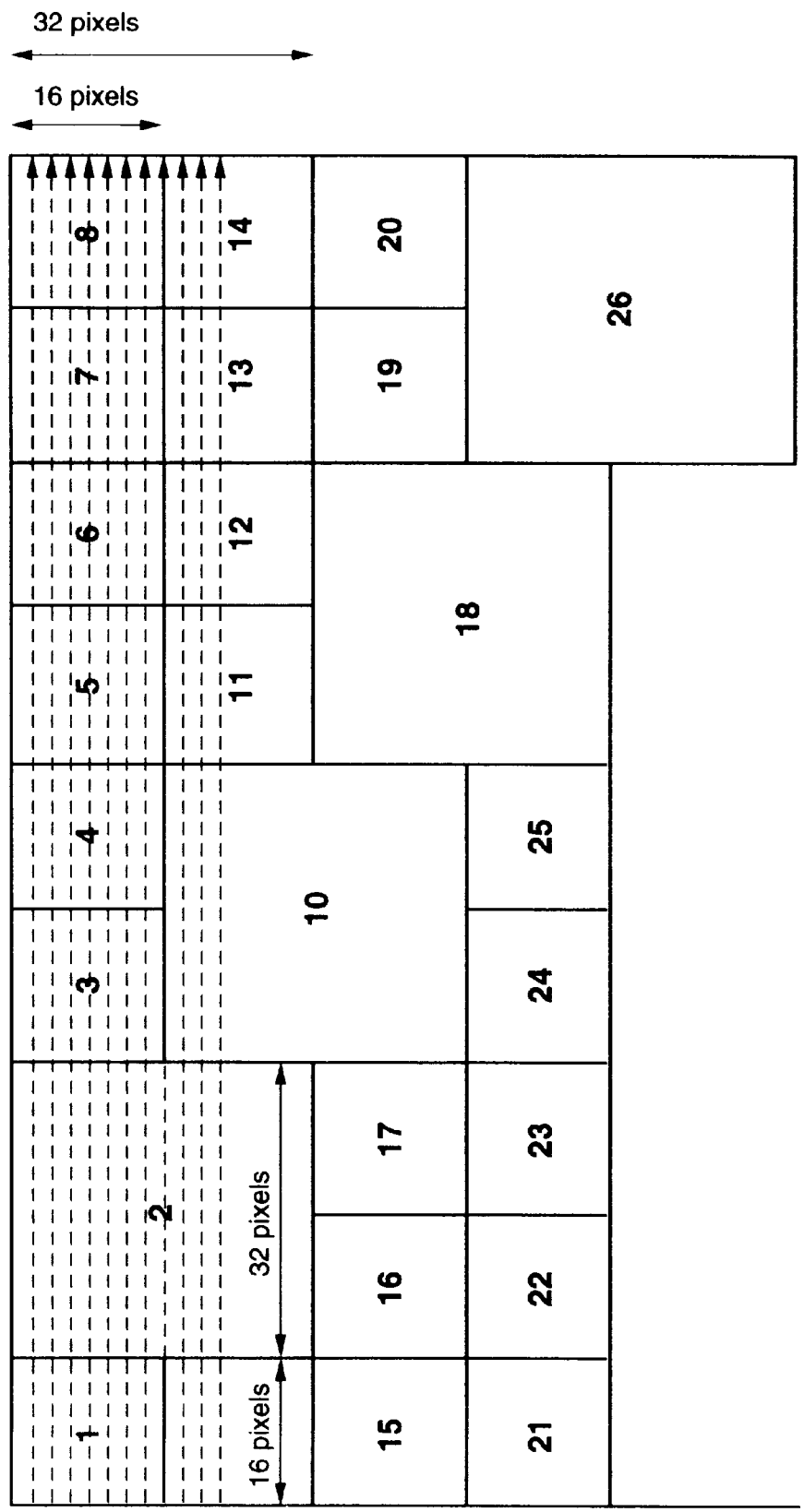
FIG. 16 is a view showing a picture block-divided at the block divider 102 of FIG. 12.

The frames are divided into macroblocks in the way shown, for example, in FIG. 16. However, only the upper part of the frame is shown in FIG. 16. The macroblock at the upper-most-right of the frame is always encoded first, with this macroblock address being taken as 1 and the frame is then scanned from the left to the right. The macroblock detected first at this time that has not yet been encoded is the next macroblock to be encoded, and the previously detected macroblock address with 1 added is taken as the macroblock address for the macroblock address detected this time. The macroblock addresses are then decided in a similar way for all of the macroblocks. The macroblock address is shown up to 26 in FIG. 16.

The macroblock address mb_address is outputted to the address generator 103, a macroblock size generator 104, a motion compensation mode generator 105 and the variable length encoder 58 shown in FIG. 12.

The macroblock size generator 104 generates a macroblock size mb_size showing the magnitude of the macroblock to be encoded in response to the macroblock type decided by the block divider 102. The mb_size is 32 for a type-1 macroblock and 16 for a type 2 or type 3 macroblock. The macroblock size generator 104 generates a signal mb_size showing whether the magnitude of the aforementioned macroblock is 16 or 32 for each of the macroblock addresses mb_address and outputs these to the motion vector detector 50, the estimation discriminator 54, the computation part 53, the motion compensator 64, a quantization scale generator 101 and the variable length encoder 58.

The motion compensation mode generator 105 generates a motion compensation mode showing the magnitude of the motion compensation units for the macroblock to be encoded in response to the macroblock type decided by the block divider 102. In the case of this embodiment, the group number of the motion vector corresponding to the macroblock to be encoded coincides with the number of units for motion compensation comprising this macroblock, i.e. in the case of type 1 and type 2 macroblocks, the motion vectors are in groups of one in the horizontal and vertical directions. In this case, the motion compensation mode is taken to be the mode 1. There are four groups of motion vectors in the case of type 3 macroblocks. In this case the motion compensation mode is taken to be mode 2. The motion compensation mode generator 105 generates a signal mc_address indicating one of the aforementioned modes for the respective macroblock addresses mb_address. The mc_mode is outputted to the motion vector detector 50, the estimation discriminator 54, the computation part 53, the motion compensator 64 and the variable length encoder 58.

The address generator 103 generates a read address corresponding to the macroblock type and the macroblock address mb_address decided by the block divider 102 in order to read the macroblock data to be encoded from the frame memory 51 and outputs this to the frame memory 51 and the motion vector detector 50.

The motion vector detector 50 detects the motion vectors for the macroblocks to be encoded in accordance with the macroblock size mb_size and the motion compensation mode mc_mode. The motion vector detector 50 further reads macroblock data to be encoded from the frame memory 51 in accordance with the adress read from the address generator 103 and outputs this to the computation part 53.

Further, the motion vector detector 50 generates an absolute value sum for the estimation error (ME remainder) for deciding which of the estimations of estimation within the picture, backward estimation, forward estimation or bi-directional estimation are carried out at the estimation discriminator 54 in the same way as for the case in FIG. 5 and outputs this to the estimation discriminator 54.

The estimation discriminator 54 also sets the estimation mode in the same way as the case occurring in FIG. 5.

In this way, the motion vector detector 50 supplies the signal for the macroblock for the reference picture (macroblock to be encoded) to the computation part 53, detects the motion vector between the estimation picture corresponding to the estimation mode selected by the estimation discriminator 54 from the four estimation modes and the reference picture, and outputs this to the variable length encoder 58 and the motion compensator 64. The picture signal supplied to the computation part 53 is in macroblock units of one of the types of type 1 to 3.

The estimation discriminator 54 sets the estimation mode to the estimation mode (the mode where motion compensation is not carried out) within a frame when the motion vector detector 50 is reading I-picture picture data from the forward source picture part 51a and the switch 53d of the computation part 53 is switched to the side of connection point a. In this way, the I-picture picture data is outputted to a wavelet transform circuit 121 via a DC difference detector 100, connection point a and the memory 107.

I picture picture data outputted by the computation part 53 is wavelet transform processed at the wavelet transform circuit 121, octave-divided, and each layer is transformed by band wavelet coefficients. This wavelet coefficient is inputted to the quantizer 57 and outputted to the variable length encoder 58 after quantization using quantization steps decided by a quantization scale generator 101 and weighting coefficients already set-up for each of the layers and bands.

A description of this wavelet transform circuit 121 will now be given using FIG. 17. At the wavelet transform circuit 121, wavelet transform processing is then performed on a plurality of macroblocks.

In this embodiment, the wavelet transform is carried out on all of the macroblocks comprising, for example, one frame. Because of this, macroblocks outputted from the computation part 53 in FIG. 12 are stored in the memory 107. When one frame portion of macroblocks is stored, this one frame portion of picture data is supplied to the wavelet transform circuit 121.

At the wavelet transform circuit 121 shown in FIG. 17, the inputted picture signal is first inputted to the horizontal low-pass filter 6-2 and the horizontal high-pass filter 6-3. The filter coefficients for the filter 6-2 and the filter 6-3 are supplied from the filter coefficient calculator 6-1 and are already preset (this is the same for other filters to be described later). At the filters 6-2 and 6-3, the low band or wide band components are extracted (filtered) from the horizontal direction of the picture, with this output being thinned-out to half in the horizontal direction by the down-sampling circuit 6-4. The picture is then divided into two bands in the horizontal direction at the time of the output of the down-sampling circuit 6-4 and 6-5. In the following, the combination of the low-pass filter, the high-pass filter and the two downsampling circuits for thinning out the outputs of these filters is referred to as a band-dividing filter bank.

The outputs of the downsampling circuits 6-4 and 6-5 are band-divided in the vertical direction in a similar manner and then inputted to a band-dividing filter bank, i.e. the output of the downsampling circuit 6-4 is inputted to the vertical low-pass filter 6-6 and the vertical high-pass filter 6-7 and filtering is performed. The outputs of the filters 6-6 and 6-7 are inputted to the downsampling circuits 6-10 and 6-11 and thinned out by 1/2 in the vertical direction. In this way, the output of the downsampling circuit 6-4 is band-divided in the vertical direction. The output of the downsampling circuit 6-5 is also inputted to the band-dividing filter bank comprising the filters 6-8 and 6-9 and the downsampling circuits 6-12 and 6-13 so as to be band divided in the vertical direction using similar processing. The inputted picture is then divided into four bands (LL, LH, HL and HH) at the time (layer 0) of the output for the two band-dividing filter banks (vertical direction, band-dividing filter bank). These four bands then become layer 0.

In the following, the combination of the above three-band dividing filter banks is referred to as a four-dividing filter bank.

The output (LL) of the downsampling circuit 6-10 is inputted to the following stage four-dividing band-dividing filter bank and four-band divided in the way described above. Namely, at this point in time (layer 1), the LL band is divided into four bands (LLLL, LLLH, LLHL and LLHH), with the inputted picture therefore being divided into a total of seven bands.

The lowest band component (output (LLLL) of the down-sampling circuit 6-22) of the signals obtained by the two four-dividing filter banks is then inputted the four-dividing band-dividing filter bank of the following stage and divided into four bands. A th is time, the LLL band is divided into four bands (LLLLLL, LLLLLH, LLLLHL and LLLLHH), so that the inputted picture is divided into a total of 10 bands.

Figure 13:
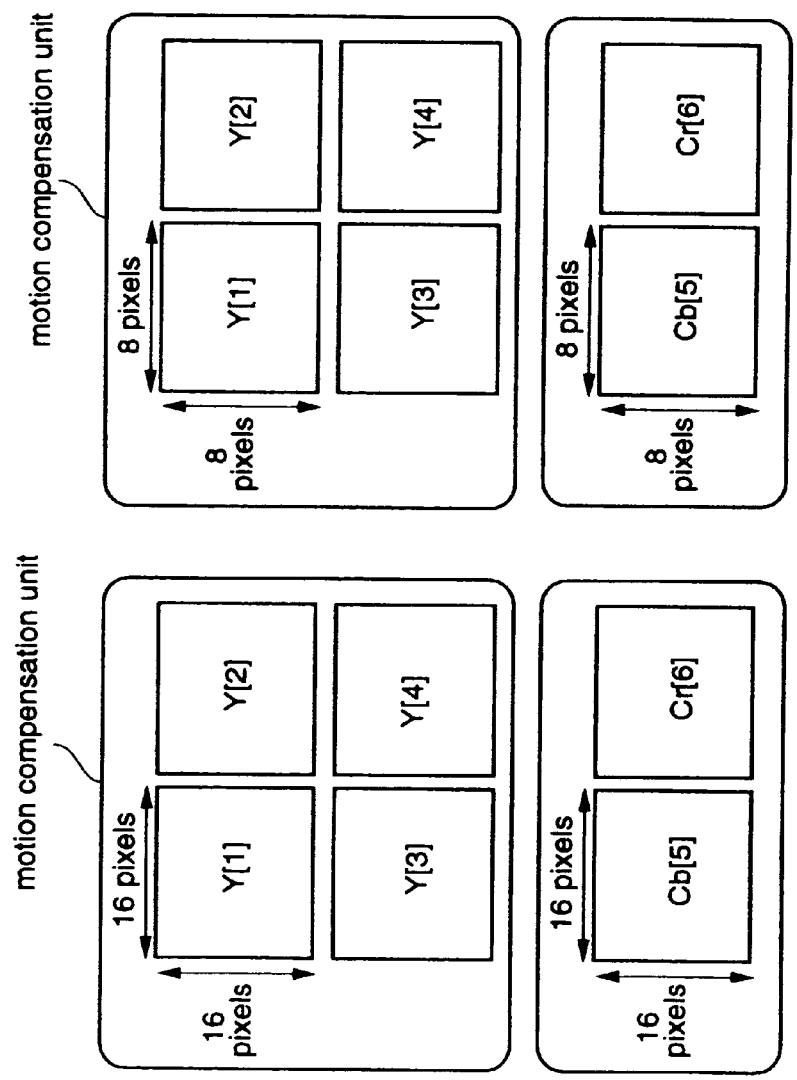
FIG. 13A, FIG. 13B and FIG. 13C are views showing macroblocks used at the encoder of FIG. 12.

Namely, the picture is band-divided as shown in FIG. 13 as a result of the above wavelet transforms.

In the embodiment in FIG. 17, a wavelet transform circuit 121 using three four-dividing band-dividing filter banks to divide the picture into 10 bands is shown but there is no limit on the number of four-dividing band dividing filter banks provided.

The wavelet transform circuit 121 is constructed using a large number of low-pass filters and high pass filters but the filter coefficients do not have to be always the same. Further, the filter coefficient used at the wavelet transform circuit 121 is obtained at the filter coefficient calculator 6-1. However, if this filter coefficient is decided upon, filter coefficients used in inverse wavelet transforms (hereinafter simply referred to as inverse filter coefficients) can be decided upon. An inverse filter coefficient can then also be obtained at together with the filter coefficient at the filter coefficient calculator 6-1. The inverse filter coefficient using this inverse wavelet transform is then outputted to an inverse wavelet transform circuit 122 and the variable length encoder 58 shown in FIG. 12. The number of four-dividing band-dividing filter banks (layer number) is also outputted from the wavelet transform circuit 121 to an inverse wavelet transform circuit 61 and the variable length encoder 58.

In encoding, i.e. here, in quantization and variable length encoding is carried out in macroblock units and reconfiguring of the macroblocks is therefore necessary after wavelet conversions have been performed on these one frame pictures. This reconfiguration process is carried out at a macroblock configuration circuit 109. Macroblocks outputted from the wavelet transform circuit 121 are reconfigured at the macroblock configuration circuit 109 in line-scan order (in ascending order of the address mb_address) using the macroblock address mb_address and the macroblock size mb_size and outputted to the quantizer 57.

Figure 19:
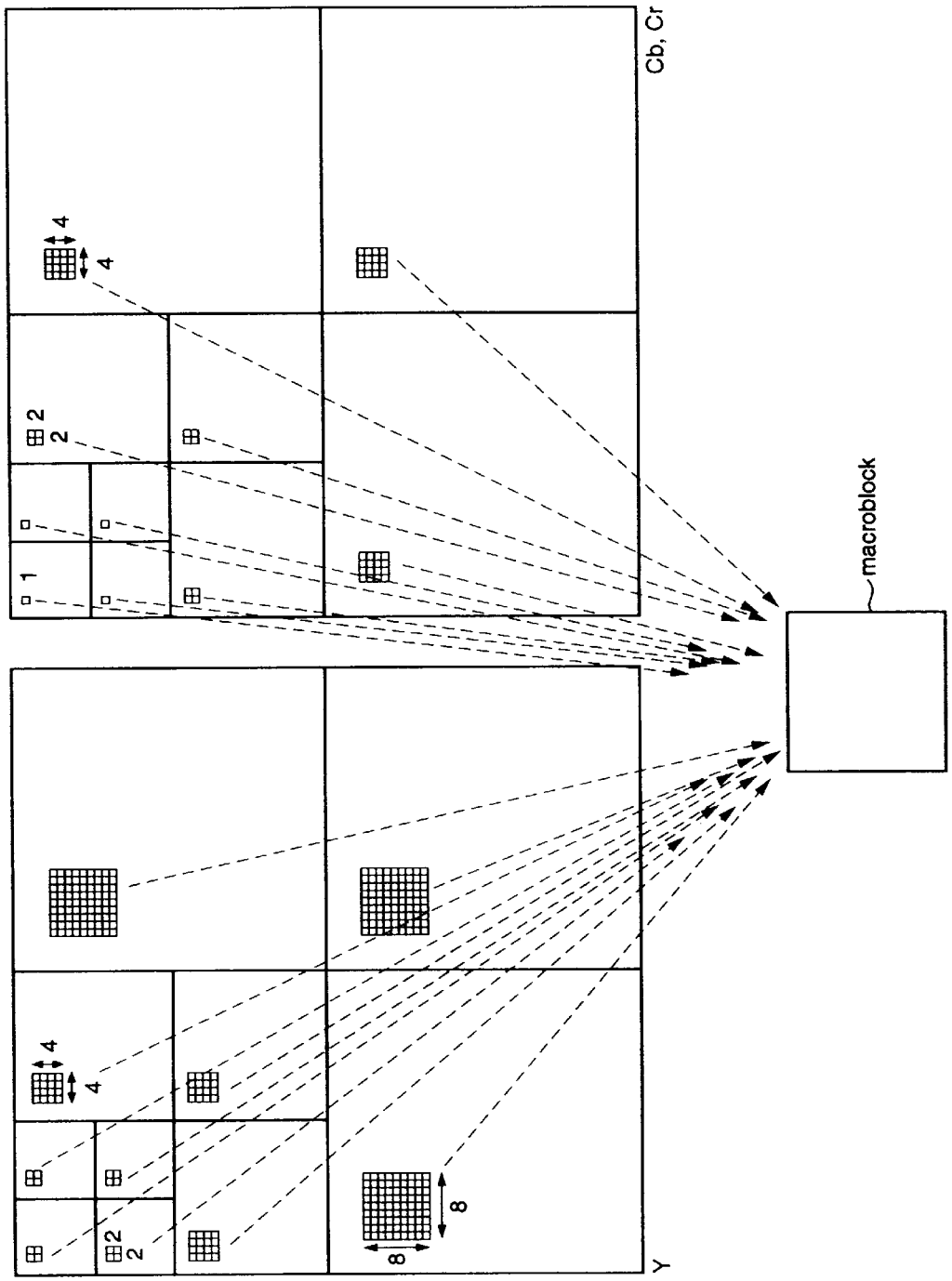
FIG. 19 is a view illustrating the process for the macroblock configuration circuit 109 of FIG. 12.

The macroblock configuration after the wavelet transforms is shown in FIG. 19. The left side of FIG. 19 shows the wavelet transform results for the luminance signal and the right side shows the wavelet transform results for the color signal. FIG. 19 shows the case for 16×16 macroblocks (and therefore the case for type 2 or type 3). The case for 32×32 pixel blocks (type 1) is also the same. The data for each of the macroblocks comprises wavelet transform coefficients for positions corresponding to each of the layers and bands. At a layer n, the magnitude of the transform coefficient corresponding to each of the macroblocks can be considered to be mb_size/$2^{(n+1)}$. For example, when the macroblock size is 16, the corresponding data at each of the bands at the layer 0 becomes the correspondingly positioned 8×8 wavelet transform coefficient for the luminance signal. The four luminance blocks within the macroblock at this times then become 4×4 wavelet transform coefficients.

The same also applies for the color difference signals. In this way, the macroblock comprises ten transform coefficients (wavelet transform coefficients) corresponding to each band.

The quantization scale generator 101 shown in FIG. 12 decides the quantization steps in accordance with the amount of data (buffer storage amount) accumulated at the transmission buffer 59 and the qualities of the source picture and outputs this to the quantizer 57, the de-quantizer 60 and the variable length encoder 58. The quantization scale is set using macroblock units based on the macroblock size.

At the quantizer 57 the wavelet transformed signal is quantized using the quantization scale decided by the quantization scale generator 101. The quantization scale is then multiplied with a weighting coefficient if necessary.

A description will now be given of this weighting coefficient. In this embodiment, the picture is band-divided into ten bands using wavelet transforms. With general picture signals, electrical power converges at the low frequency component s when this kind of band-dividing is carried out. This low-band component is, however, necessary for viewing and deterioration of the low-frequency component is detrimental to the quality of the decoded picture. With respect to this point, the electrical power is particularly converged on the high frequency component and is not particularly noticeable when viewing.

Figure 20:
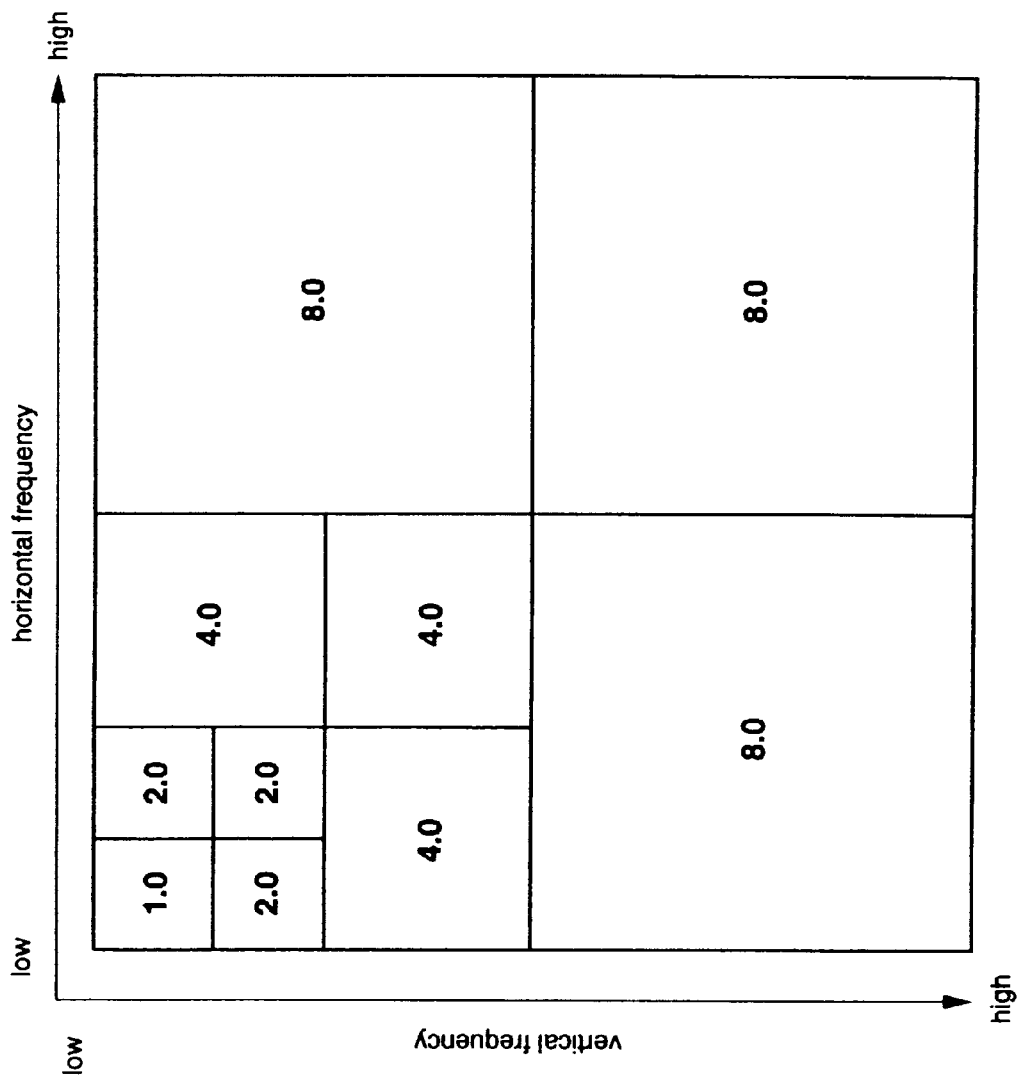
FIG. 20 is a view showing weighting coefficients used at the quantizer 57 of FIG. 12.

Because of this, there is benefit to be had visually by allotting a larger number of bits to the low frequency component. Weighting coefficients w corresponding to each of the layers and bands are then applied to the quantization scale and quantization is performed. An example of the weighting coefficients for each of the layers and bands is shown in FIG. 20. The weighting coefficient is already supplied to the quantizer 57 shown in FIG. 12 and is further supplied to the de-quantizer 60 and the variable length encoder 58 via the quantizer 57. It is also possible to change the weighting coefficient midway through encoding. In this case, it is necessary to supply the modified weighting coefficient to the de-quantizer 60 and the variable length encoder 58.

A quantization coefficient Q is outputted at the quantizer 57 by carrying out the quantization process corresponding to the calculation shown in the following equation:

$$Q=(S \times w)//q$$

where S is a wavelet transform coefficient, W is a weighting coefficient and q is a quantization scale. Further, A//B and A/B mean calculations where decimal points are rounded up.

The variable length encoder 58 converts image data (in this case, I picture data) supplied by the quantizer 57 to variable length code by performing, for example, Huffman coding or arithmetical encoding in accordance with quantization steps (scales) provided by the quantizer 57 while referring to a table if necessary. The converted data is then outputted to the transmission buffer 59.

Moreover, the quantization step (scale) and weighting coefficient from the quantizer 57, the estimation mode (a mode showing the setting of one of estimation within the picture, forward estimation, backward estimation and bidirectional estimation) from the estimation discriminator 54, the motion vector from the motion vector detector 50, the macroblock size from the macroblock size generator 104, the motion compensation mode (showing the number of motion vectors (i.e. the number of motion compensation units comprising a macroblock) within a macroblock) form the motion compensation mode generator 105, the macroblock address from the macroblock address generator 106 and the wavelet transform coefficient (inverse filter coefficient) and wavelet layer number from a wavelet transform circuit 107 are inputted at the variable length encoder 58 and variable length encoded.

With regards to the macroblock address, the code for the previous time and the difference with the macroblock address for the transmitted macroblock (macroblock address increment) are encoded and outputted.

The syntax (format) of the bitstream outputted from the variable length encoder 58 is described in the following with reference to FIG. 25 to FIG. 33.

The transmission buffer 59 stores the inputted data once and outputs data corresponding to the stored amount to the quantizer 57. In this way, as described above, overflowing or underflowing of the transmission buffer 59 is prevented.

The data accumulated in the transmission buffer 59 is then read-out at a prescribed timing and outputted via a transmission path of recorded on a recording medium 3.

On the other hand, I picture data outputted by the quantizer 57 is also inputted to the de-quantizer 60 as well as to the variable length encoder 58 and de-quantized in accordance with the quantization scale and weighting coefficient provided by the quantizer 57. Namely, at the de-quantizer 60, a de-quantization coefficient (in this case, the wavelet transform coefficient) S' is outputted by carrying out processing corresponding the calculation shown in the following equation.

$$S'=(Q\times q)/w$$

Figure 21:
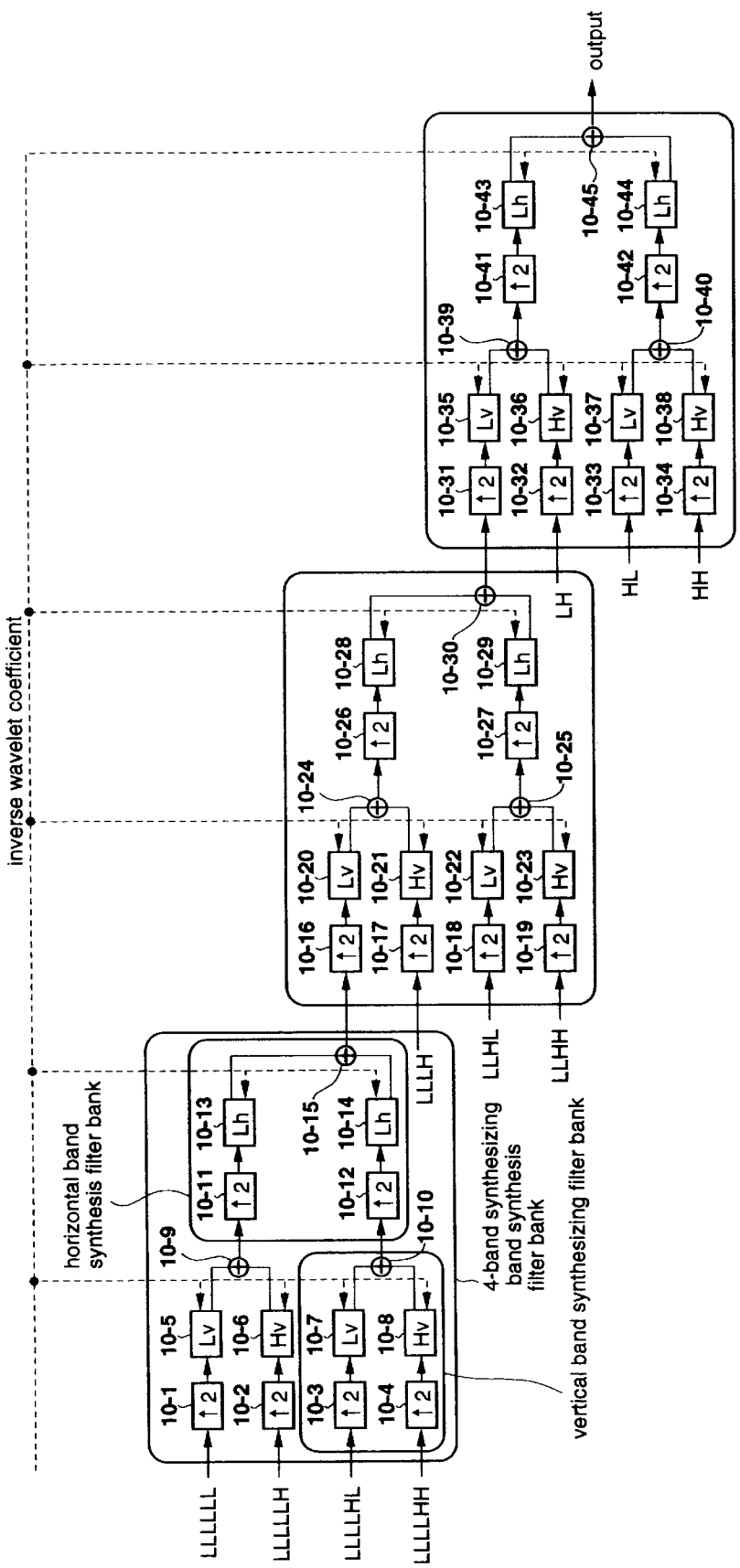
FIG. 21 is a block diagram showing an example configuration of the inverse wavelet transform circuit 122 of FIG. 12.

The output of the de-quantizer 60 is then inputted to the inverse wavelet transform circuit 122 via the memory 108. An example configuration of the inverse wavelet transform circuit 122 is shown in FIG. 21.

The inverse wavelet transform is carried out using the same units as the units used at the wavelet transform circuit 121 described previously and is therefore carried out using frame units in this embodiment. Because of this, the output of the de-quantizer 60 shown in FIG. 12 is stored in the memory 108 and supplied to the inverse wavelet transform circuit 122 when one frame portion of wavelet transform coefficients have been stored.

With inverse wavelet transforms, on the contrary to wavelet transforms, band synthesis is carried out from layer 2. Namely, the LLLLLL band for layer 2 in FIG. 21 is inputted to a vertical low-pass filter 10-5 after being inputted to a vertical up-sampling circuit 10-1 and being two-times up-sampled (interpolated) in the vertical direction. The LLLLLH band of layer 2 inputted to a vertical high-pass filter 10-6 and filtered in the vertical direction after having been inputted to a vertical up-sampling circuit 10-2 and two-times up-sampled in the vertical direction. The outputs of the filters 10-5 and 10-6 are then inputted to an adder 10-9 and added. In this way, two bands LLLLLL and LLLLLH are synthesized to one band. In the following, the combination of the vertical up-sampling circuits 10-1 and 10-2, the vertical low-pass filter 10-5, the vertical high-pass filter 10-6 and the adder 10-9 is referred to as a vertical band synthesizing filter bank as appropriate.

The bands LLLLHL and LLLLHH for the layer 2 are supplied to the vertical band synthesizing filter bank comprising vertical up-sampling circuits 10-3 and 10-4, a vertical high-pass filter 10-7, a vertical low-pass filter 10-8 and an adder 10-10 and synthesized into one band in the same way.

The output of the adder 10-9 is inputted to a horizontal low-pass filter 10-13 and filter in the horizontal direction after having been inputted to a horizontal up-sampling circuit 10-11 and two-times up-sampled in the horizontal direction. At the same time, the output of the adder 10-10 is inputted to a horizontal high-pass filter 10-14 and filtered in the horizontal direction after having been inputted to a horizontal up-sampling circuit 10-12 and two-times up-sampled in the horizontal direction. The outputs of the filters 10-13 and 10-14 are outputted to an adder 10-15 and added. As a result, the four bands for layer 2 are synthesized into one band and the LLLL band is re-configured. In the following, the combination of the horizontal up-sampling circuits 10-11 and 10-12, the horizontal low-pass filter 10-13, the horizontal high-pass filter 10-14, and the adder 10-15 will be referred to as the horizontal band synthesizing filter bank as appropriate. Further, the filter bank for synthesizing four bands into one band using the combination of the vertical band synthesizing filter bank and the horizontal band synthesizing filter bank will be referred to as a four band synthesizing band synthesizing filter bank.

The output of the adder 10-15 (LLLL) and the three bands (LLLH, LLHL and LLHH) for layer 1 are supplied to the following stage four band synthesizing band synthesizing filter bank and reconfigured into one band in the same way as for the case described above in such a manner that the LL band is reconfigured.

The reconfigured band LL (output of an adder 10-30) and the three bands (LH, HL, HH) for the layer 0 are supplied to a further following stage four band synthesizing band synthesizing filter bank and band synthesized. The output (output of an adder 10-45) of this four band synthesizing band synthesizing filter bank then becomes the output of the inverse wavelet transform circuit 122.

A large number of filters can be used at the inverse wavelet transform circuit 122, with the filter coefficients (inverse filter coefficients) used at these filters being decided at and supplied by the wavelet transform circuit 121 (filter coefficient calculator 6-1) of FIG. 17 as described above. The inverse wavelet transform circuit 122 then carries out inverse wavelet transforms in accordance with transform coefficients and layer numbers supplied from the inverse wavelet transform circuit 122.

Next, it is necessary to reconfigured the macroblocks after the inverse wavelet transformations because the motion compensation for generating the estimation picture is carried out in macroblock units. Inverse wavelet transform coefficients (picture data) outputted from the inverse wavelet transform circuit 122 are therefore supplied to a macroblock configuring circuit 110 shown in FIG. 12 and the macroblocks are reconfigured. Namely, the macroblock configuring circuit 110 configures the macroblocks outputted from the inverse wavelet transform circuit 122 based on the macroblock address mb address and the macroblock size mb_size and outputs this data to the forward estimation picture part 63a of the frame memory 63 via the adder 62, where the data is stored.

After the I picture has been process ed in this way, the motion vector detector 50 starts processing the picture data for the P picture stored in the backward source picture part 51c, as described previously. Then, as in the above-described case, the absolute value sum for the difference (estimation error) between frames is supplied from the motion vector detector 50 to the estimation discriminator 54 in macroblock units. The estimation discriminator 54 then sets the estimation within a picture mode or the forward estimation estimation mode in accordance with the absolute value sum of the estimation error for this P picture macroblock.

When the estimation within a frame mode is set in cases other than those for I pictures, the computation part 53 switches the switch 53d over to the side of connection point a. Signals that come as input to the computation part 53 at this time are inputted to the DC difference detector 100. The DC difference detector 100 then calculates the mean values DC[1] to DC[6] for each of the six blocks Y[1] to Y[4], Cb[5] and Cr[6] within the macroblocks in this case (the case where the mode of estimation within a frame is set for picture data for pictures other than I pictures). The DC difference detector 100 then subtracts these mean values DC[1] to DC[6] from each of the pixel values for each of the blocks Y[1] to Y[4], Cb[5] and Cr[6] and outputs the difference value to the wavelet transform circuit 121 via the memory 107 in the same way as the case for the I picture.

Figure 22:
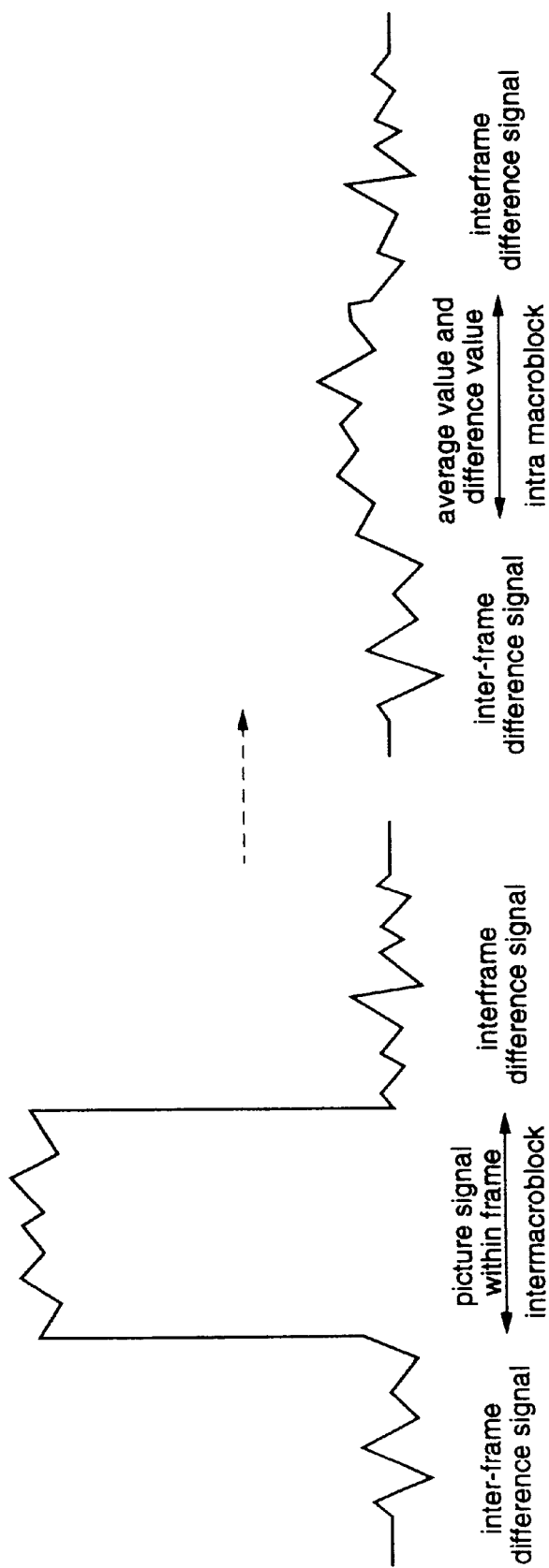
FIG. 22A and FIG. 22B are views illustrating the process for the DC difference detector 100 of FIG. 12.

Here, wavelet transforms occurring at the wavelet transform circuit 121 are carried out in frame units rather than in macroblock units. Further, the inter-frame difference signal (estimation error) is usually a signal of a smaller amplitude (of an average value in the region of zero) than the picture signal if the motion detection has been more or less accurate. Therefore, when macroblocks that have been encoded within the frame and macroblocks that have been encoded between frames are mixed within one frame, dramatic discontinuities occur at the boundaries of the macroblocks encoded within a frame and the macroblocks encoded across frames when the macroblocks encoded within a frame are handled without modification, as shown in FIG. 22A. As a result, when this kind of frame undergoes wavelet transformations, large amounts of additional electrical power is generated at the boundary portions and the compression efficiency deteriorates. In order to avoid this, the signal amplitude of macroblocks encoded within a frame for pictures other than I pictures is made smaller by subtracting this mean value to obtain the difference, as shown in FIG. 22B.

The mean values DC[1] to DC[6] (hereinafter referred to as the "intra DC" as appropriate) calculated at the DC difference detector 100 in FIG. 12 are then outputted after being outputted to the variable length encoder 58 and variable length encoded. The difference between the intra DC and the intra DC encoded directly before is calculated and this difference value is then variable length encoded.

The macroblocks for which the differences have been calculated from the mean values are outputted via the memory 107, the wavelet transform circuit 121, the macroblock configuration circuit 109, the quantizer 57, the variable length encoder 58 and the transmission buffer 59. Further, this data is then locally decoded via the de-quantizer 60, the memory 108, the inverse wavelet transform circuit 122 and the macroblock configuring circuit 110, supplied to the backward estimation picture part 63*b* of the frame memory 63 via the adder 62 and stored. The mean values DC[1] to DC[6] are then added with respect to each of the blocks within a macroblock at the adder 62.

During forward estimation mode, the switch 53*d* is switches over to the side of connection point b, data for the picture (in the current case, I picture picture) stored in the forward estimation picture part 63*a* of the frame memory 53 is read-out, and motion compensation is carried out by the motion compensator 64 in accordance with the motion vectors outputted by the motion vector detector 50. Namely, when a forward estimation mode setting instruction is given by the estimation discriminator 54, the motion compensator 64 shifts the read address for the forward estimation picture part 63*a* from the position corresponding to the macroblock position currently being outputted by the motion vector detector 50 by an amount corresponding to the motion vector, reads the data, and generates estimation picture data. The amount of data read at this time is decided by the macroblock size. In the case of type 3 macroblocks, estimation picture data is generated using four motion vectors.

Estimation picture data outputted from the motion compensator 64 is supplied to the calculator 53*a*. The calculator 53*a* subtracts from reference picture macroblock data estimation picture data corresponding to this macroblock supplied by the motion compensator 64 and outputs the difference. The data number of each of the macroblocks at this time is indicated by the macroblock size.

This difference data is supplied to the wavelet transform circuit 121 via the memory 107 in the same manner. The difference data is then outputted via the macroblock configuration circuit 109, the quantizer 57, the variable length encoder 58 and the transmission buffer 59 after being wavelet transformed by the wavelet transform circuit 121. This data is then locally decoded via the de-quantizer 60, the memory 108, the inverse wavelet transform circuit 122 and the macroblock configuring circuit 110 and inputted to the adder 62.

The same data as the estimation picture data supplied to the calculator 53*a* is also supplied to this adder 62. The adder 62 adds estimation picture data outputted by the motion compensator 64 is added to the difference data outputted by the macroblock configuring circuit 110. As a result of this, picture data for the original (decoded) s picture is obtained. The picture data for this P picture is then supplied to the backward estimation picture part 63*b* of the frame memory 63 and stored.

When the I picture and B picture data is stored in the forward estimation picture part 63*a* and the backward estimation picture part 63*b* respectively, the motion vector detector 50 executes the B picture processing, as described above, i.e. the estimation mode is first set at the estimation discriminator 54 to be one of the modes of estimation within a frame, forward estimation, backward estimation or bidirectional estimation in accordance with the magnitude of the absolute value sum of the difference between the frames in macroblock units.

As described above, during the m ode of estimation within a frame or the forward estimation mode, the switch 53*d* is switched over to connection point a or connection point b. In this case, processing is carried out in the same way as the case for a P picture.

When the backward estimation mode or bidirectional estimation mode is set, the switch 53*d* is switched over to connection point c or connection point d.

During backward estimation mode where the switch 53*d* is switched to connection point c, the data for the picture (in this case, the picture for the P picture) stored in the backward estimation picture part 63*b* is read-out and motion compensation corresponding to the motion vector outputted by the motion vector detector 50 is carried out by the motion compensator 64. Namely, when a backward estimation mode setting instruction is given by the estimation discriminator 54, the motion compensator 64 shifts the read address for the backward estimation picture part 63*b* from the position corresponding to the macroblock position currently being outputted by the motion vector detector 50 by an amount corresponding to the motion vector, reads the data, and generates estimation picture data. The amount of data read at this time is decided by the macroblock size. Estimation picture data is then generated using four vectors in the case of a type 3 macroblock.

The estimation picture data outputted from the motion compensator 64 is supplied to the calculator 53*b*. The calculator 53*b* subtracts from the reference picture macroblock data estimation picture data provided from the motion compensator 64 corresponding to this macroblock and this difference (estimation error) is outputted. The data number of each of the macroblocks at this time shows the macroblock size.

This difference data is supplied to the wavelet transform circuit 121 via the memory 107. This data is then outputted via the macroblock configuration circuit 109, the quantizer 57, the variable length encoder 58 and the transmission buffer 59 after being wavelet transformed at the wavelet transform circuit 121.

During the bi-directional estimation mode where the switch 53*d* is switched over to connection point d, the data for the picture (in the current case, an I picture picture) stored in the forward estimation picture part 63*a* and the data for the picture (in the current case, a P picture picture) stored in the backward estimation picture part 63b is read out. Motion compensation corresponding to the motion vectors outputted by the motion vector detector 50 is then performed by the motion compensator 64. Namely, when a bi-directional estimation mode setting instruction is given by the estimation discriminator 54, the motion compensator 64 shifts the read addresses for the forward estimation picture part 63a and the backward estimation picture part 63b from the positions corresponding to the macroblock positions currently being outputted by the motion vector detector 50 by an amount corresponding to the motion vectors (in this case there are two motion vectors, one for forward estimation picture use and one for backward estimation picture use), reads the data, and generates estimation picture data. The amount of data read at this time is shown by the macroblock size. In the case of a type 3 macroblock, estimation picture data is generated using four motion vectors.

Estimation picture data outputted from the motion compensator 64 is supplied to the calculator 53c. The calculator 53c then subtracts the mean value of the estimation picture data supplied by the motion compensator 64 from the reference picture macroblock data supplied by the motion vector detector 50 and outputs this difference. The data number for each of the macroblocks at this time is indicated by the macroblock size.

This difference data is then outputted via the memory 107, the wavelet transform circuit 121, the macroblock configuration circuit 109, the quantizer 57, the variable length encoder 58 and the transmission buffer 59.

The B picture picture is not stored in the frame memory 63 so as not to be not to be taken as the estimation picture for other pictures in the way described previously.

A description is given in the above centered about luminance blocks but processing and transmission can also be carried out in the same way for color difference blocks taking the macroblocks shown in FIG. 13A, B and C as units. The motion vectors for the case of processing color difference blocks are ½ in the vertical and horizontal directions of the corresponding luminance signal blocks.

At the variable length encoder 58 in FIG. 12, when the macroblock to be variable length-encoded is a skip macroblock, variable length encoding is not carried out on this macroblock and the data for this macroblock is therefore not outputted from the variable length encoder 58. The details of the skip macroblock will be described later.

Next, the method for encoding the macroblock address will be described. The macroblock addresses are successive integers starting from 1, as described above. When the variable length encoder 58 encodes and then transmits macroblock data (this therefore does not include skip macroblocks), the difference macroblock_address_increment between the macroblock address for the macroblock encoded the previous time and the current macroblock address is calculated and is then variable length encoded. Therefore, when macroblock_address_increment is two or more, this means that a skip macroblock is present.

Next, a description is given of skip macroblocks. Skip macroblocks do not exist at macroblocks comprising I pictures. In the case of macroblocks comprising P pictures, macroblocks are taken to be skip macroblocks when the following four conditions are fulfilled. At the variable length encoder 58, when the macroblock that is the encoding target is a skip macroblock, the motion vector holding value is reset to zero. Namely, the motion vector is transmitted as the difference with the previously encoded motion vector. As a result, the motion vector encoded the previous time is held at the variable length encoder 58 but this holding value is reset to zero when the macroblock is a skip macroblock.

The macroblock is a forward estimation macroblock.

The motion vector is zero.

The macroblock size mb_size is the same as that for the macroblock taken as the encoding target the previous time.

All of the wavelet coefficients for the macroblocks are zero.

With regards to the B picture, when macroblock is taken to be a skip macroblock when the following seven conditions are fulfilled. At this time, the motion vector holding value is kept as is (an update of the holding value due to the motion vector corresponding to the skip macroblock is not held).

The macroblock is not an intra macroblock.

The macroblock size is the same as the previous macroblock size.

The estimation mode (forward, backward, bi-directional) is the same as the estimation mode for the macroblock taken as the encoding target the previous time.

The motion compensation mode (number of motion vectors) is the same as for the macroblock taken as the encoding target the previous time.

The motion vectors are the same as for the macroblock taken as the encoding target the previous time.

The macroblock taken as the encoding target the previous time is not an intra macroblock.

All of the wavelet coefficients for the macroblocks are zero.

Next, the structure of an embodiment of a decoder to which the present invention is applied is shown in FIG. 23.

In FIG. 23, portions for which the basic structure is the same as the case in FIG. 9 are given the same numerals and their detailed description is omitted.

As described above, encoded picture data is supplied to the variable length decoder 82 of the decoder 90 after being stored once in the signal receiving buffer 81. The variable length decoder 82 variable length decodes data supplied from the signal receiving buffer 81, outputs the motion vector, estimation mode, macroblock size and motion compensation mode to the motion compensator 87 and a macroblock configuring circuit 202, outputs the quantization scale and weighting coefficient to the de-quantizer 83, outputs the intra DC's (DC[1] to DC[6]) to the calculator 85 and outputs the inverse waveform transform coefficient and wavelet number to an inverse wavelet transform circuit 83, as well as outputting the decoded picture data to the de-quantizer 83. The macroblock address and the macroblock size are also provided to a write address generator 201.

A description will now be given of the macroaddress decoding. As described above, the macroblock address is not encoded without modification within the bitstream. Namely, the difference macroblock_address_increment between the macroblock address for the macroblock decoded the previous time and the macroblock address of the macroblock to be decoded this time is encoded. The variable length decoder 82 then decodes this macroblock_address_increment and obtains the macroblock address of the current macroblock by adding this to the macroblock address decoded the previous time. The maximum value for the macroblock_address_increment is 33 in order to fit with the MPEG 2 method, with values larger than this being expressed in combination with macroblock_escape.

It is shown that a skip macro block exists when the macroblock_address_increment is 2 or more and the skip macroblock number becomes macroblock_address_increment-1.

Skip macroblocks are decoded in the following way.

Namely, when a picture to be decoded is a P picture, the skip macroblock is interpreted as fulfilling the four conditions for skip macroblocks described above and is decoded based on the macroblock decoded the previous time. In this case, the holding value for the motion vector is reset to zero.

When the decoded picture is a B picture, the skip macroblock is interpreted as fulfilling the aforementioned seven conditions and is decoded based on the macroblock decoded the previous time. In this case, the holding value for the motion vector is held without modification.

The de-quantizer 83 de-quantizes picture data supplied by the variable length decoder 82 in accordance with the quantization scale and weighting coefficient supplied by the same variable length decoder 82 and outputs the resulting data to an inverse wavelet transform circuit 203 via the memory 200.

The inverse wavelet transforms occurring at the inverse wavelet transform circuit 203 are carried out using the same frame units as for the case occurring at the inverse wavelet transform circuit 122 of FIG. 12. Because of this, data for each macroblock is temporarily stored in a memory 200 and inverse wavelet transform processing is carried out after one frame portion of data has been stored.

With regards to this, the output of the inverse wavelet transform circuit 203 is supplied to the macroblock configuring circuit 202 because the motion compensation is carried out using motion compensation units included in the macroblock, with the macroblock then being reconfigured at the macroblock configuring circuit 202. Namely, the macroblock is re-configured at the macroblock configuring circuit 202 from the output of the inverse wavelet transform circuit 203 using the macroblock address ab_address and the macroblock size mb_size and is then supplied to the calculator 85.

When picture data supplied by the macroblock configuring circuit 202 is I picture data, this data is outputted by the calculator 85 and stored in the forward estimation picture part 86a of the frame memory 86 in order to generate estimation picture data for picture data (P or B picture data) inputted at the calculator 85 afterwards. This data is then outputted to an external output device not shown in the drawings at a prescribed timing as an output playback picture.

In this way, decoded macroblock data is stored in the frame memory 86. Because fixed size macroblocks are used in related methods such as MPEG 1 and MPEG 2, if the macroblock address is known, the portion within the frame at which this macroblock is positioned can be determined. However, in this embodiment, the position within the frame of a macroblock cannot be determined only from the macroblock address because variable size macroblocks are handled. The position within the frame of data for each macroblock is therefore calculated at the write address generator 201 based on the macroblock address and the macroblock size.

This is to say that the address is generated at the write address generator 201 while the macroblock data is being written to the frame memory 86 using the macroblock address and the macroblock size from the variable length decoder 82.

A description will now be given with reference to FIG. 24A, B and C of a method for specifying the position within the macroblock frame using the macroblock address and the macroblock size for the case described above where block dividing is carried out, for example, in the way shown in FIG. 16. The macroblock address is given at the encoder in such a manner as to increase in line scan order in the way shown in FIG. 16. In this embodiment, the macroblock size is one of either 16 or 32.

The write address generator 201 shown in FIG. 23 makes the kind of maps shown in FIG. 24A, B and C. Namely, this map is formed in memory for storing the positions of one frame-portion of macroblocks and is of a length and width that is 1/16th of the length and width of the picture frame for the luminance of the decoded signal. The depth is taken to be one bit and a 1 or a 0 can therefore be stored at each point.

This map is initialized to all zeros before data for each frame is decoded (i.e. when the picture header shown in FIG. 28 is decoded).

When the macroblock for macroblock address 1 is to be decoded, the position of the macroblock within the frame is at the uppermost left of the frame. A parameter referred to as a map pointer will now be introduced. A map pointer is a pointer pointing a position at the upper left corner of the map for the macroblock to be decoded, with the map pointer pointing to the uppermost left corner of the map when the macroblock address is 1 (FIG. 24A).

When the macroblock is decoded, a prescribed position (point) on the map is changed from 0 to 1 in accordance with the macroblock size taking the point pointed to by this map pointer as a lead. Namely, when the macroblock size of the decoded macroblock is 16, just the point indicated by the map pointer is changed by 1. Further, when the macroblock size is 32, the 2×2 points at the upper left of the position indicated by the map pointer are all put to 1.

When decoding for one macroblock is completed, the map is scanned in line-scan sequence. At this time, the map pointer is shifted to the first point at which the value is zero and this position is taken as the position of the macroblock to be decoded next. The map pointer is therefore moved to the point shown in FIG. 24B after the macroblock of macroblock address 1 has been decoded. The map is 1/16th of the size in the horizontal and vertical directions of the picture frame for the decoded picture. The position within the macroblock frame can therefore be specified by carrying out prescribed conversions on the coordinates of the point at which the map pointer is positioned. Further, the write address for the frame memory 86 shown in FIG. 23 can also be obtained.

FIG. 24C shows the map conditions and the position of the map pointer after the macroblock for which the macroblock address is taken to be 15 in FIG. 16 is decoded.

The above method is one example where the address (position of the macroblock within the frame) can be decided by considering the macroblock address and the macroblock size. It is therefore possible to also calculate the address using other methods.

Returning to FIG. 23, when picture data provided by the macroblock configuring circuit 202 is P picture data where picture data for one frame previous is taken as the estimation picture data or forward estimation mode data, the picture data (I picture data) for one frame previous stored in the forward estimation picture part 86a of the frame memory 86 is read-out and motion compensation corresponding to motion vectors outputted by the variable length decoder 82 is performed at the motion compensator 87. This motion-compensated output is then added with picture data (difference data) supplied by the macroblock configuring circuit 202 at the calculator 85 and outputted. The added data, i.e. the decoded P-picture data is also supplied to and stored in the backward estimation picture part 86b of the frame memory 86 for generating estimation picture data for the picture data (B picture or P picture data) inputted afterwards at the calculator 85.

P picture data that is estimation mode within a picture data is added at the calculator 85 with the intra DC's (DC[1] to DC[6]) provided by the variable length decoder 82. The decoded picture for the P picture decoded as a result is then stored in the backward estimation picture part 86b in the same way as the case for the aforementioned forward estimation mode.

This P picture is the picture to be displayed after the next B picture and is therefore not outputted as a play-back picture to an external output device not shown in the drawings (as described above, a P picture inputted after a B picture is processed and transmitted before the B picture).

When picture data supplied by the macroblock configuring circuit 202 is B picture data, I picture picture data (in the case of the forward estimation mode) stored in the forward estimation picture part 86a of the frame memory 86, P picture picture data (in the case of the backward estimation picture mode) stored in the backward estimation picture part 86b or bi-directional picture data (in the case of the bi-direction estimation mode) is read out in accordance with the estimation mode supplied by the variable length decoder 82. Motion compensation is then carried out at the motion compensator 87 in accordance with motion vectors outputted by the variable length decoder 82 and an estimation picture is generated. An estimation picture is not, however, generated when motion compensation is not necessary (in the case of the estimation within the picture mode).

In this way, data that has undergone motion compensation at the motion compensator 87 is added with the output of the macroblock configuring circuit 202 at the calculator 85. However, in the case of the estimation within the frame mode, the output of the macroblock configuring circuit 202 and the intra DC's are added in the same way as the case for P pictures described above. This addition output is then outputted immediately as playback pictures to an external output device not shown in the drawings.

However, this addition output is a B picture, cannot be utilized in estimation picture generation for other pictures and is therefore not stored in the frame memory 86.

After the picture for the B picture is outputted, picture data for the P picture stored in the backward estimation picture part 86b is read out and supplied to the calculator 85 via the motion compensator 87. Motion compensation is not, however, carried out at this time.

In the above, a description is given with regards to luminance signal processing but the same description can be given using color difference signal processing. However, in this case, the motion vectors used are half of those used for the luminance signal in the vertical and horizontal directions.

Next, a description is given with reference to FIG. 25 to FIG. 33 of the format of the bitstream outputted from the encoder of FIG. 12. FIG. 25 to FIG. 33 show bitstream formats for this embodiment that are formats that can be used with ISO-IEC/JTC1/SC29/WG11 IS 13818-2. Parts listed in the No of bits Mnemonic column are flags (data) that are actually transmitted.

FIG. 25 shows the sequence header format. The sequence header is attached to the head of the bitstream. The sequence_start_code is a 32-bit code indicating the start of the sequence header. Start codes for each of the various headers (for example, the group of pictures header of FIG. 27) other than this sequence_start_code are fixed bit strings comprising code that does not occur at other portions of the bitstream. Therefore, if a part of the bitstream is lost for whatever reason and therefore cannot be decoding, another start code can be detected and decoding can be started again.

The wavelet_layer_number is a four-bit flag indicating how many layers (the number of four band synthesizing band synthesizing filters) are required for construction of the inverse wavelet transform circuit 203 shown in FIG. 23. Further, wavelet_coefficients( ) are filter coefficients (inverse filter coefficients) used at each of the layer filters of the inverse wavelet transform circuit 203. Filtering is then carried out at the inverse wavelet transform circuit 203 using this inverse filter coefficient wavelet_coefficients( ) in the same manner as the case for the inverse wavelet transform circuit 122 of FIG. 12.

Two methods are shown in FIG. 26A and FIG. 26B as methods for transmitting the inverse filter coefficients using inverse wavelet transforms. Namely, FIG. 26A shows the format for transmitting a flag displaying pre-decided groups (sets) for the inverse filter coefficients used at each filter of each layer and which of these groups is to be used. This is decided if one of the combination of the high-pass filter and the low-pass filter is decided upon. Because of this it is sufficient to transmit one index for each layer. In FIG. 26A, the index wavelet_coeff_index is an eight-bit flag, with it being possible to indicate 256 filter coefficient combinations. In this embodiment this bit number is eight bits, but this bit number is by no means limited to eight bits.

In this case, one of the 256 filter coefficient combinations is selected at the filter coefficient calculator 6-1 of the wavelet transform circuit 121 of FIG. 12 and set at each of the filters. The wavelet_coeff_index corresponding to the selected filter coefficient combination is then supplied to the variable length encoder 58.

FIG. 26B shows the format when filter coefficients are directly transmitted using each layer. In this case, the tap number for the low-pass filter and the high-pass filter and the coefficient corresponding to this tap number is transmitted.

Returning to FIG. 25, load_intra_weighting-matrix and load_non_intra_weighting matrix are flags indicating whether or not weighting coefficients used with the P, B and P pictures are to be downloaded. When the weighting coefficients are to be downloaded, the weighting coefficients are listed after the respective flags. The size of this data then becomes 8 bits×(wavelet_layer_number×3+1). The band number can be obtained from wavelet_layer_number (layer number) in accordance with the equation (wavelet-layer_number X 3+1). Different weighting coefficients are usually used for the I, P and B pictures, but the same weighting coefficients can also be used.

FIG. 27 shows the format for the group of picture header. This is the same as the case for the usual MPEG method.

FIG. 28 shows the picture header format. Here, number_of_macroblock is a 16-bit flag showing the number of macroblocks existing in this frame.

FIG. 29 shows the format for the macroblock header. Here, macroblock_size is a 2-bit flag showing the size of the macroblock. mc_mode shows the units of motion compensation for this macroblock, i.e. this is a flag indicating whether one motion vector exists or whether four motion vectors exist. In the case of 1, number_of_motion_vectors is 1, while in the case of 4, number_of_motion_vectors is 4. Just this number of forward_motion_vector or backward_motion_vector is then transmitted. This mc_mode is set to one of macroblock_motion_forward or macroblock_motion_backward at macroblock-type of the VLC code table shown in FIG. 30 to FIG. 32. macroblock_size is only transmitted when it is shown that the macroblock size is 16. The motion vectors are transmitted using the transmission format shown in FIG. 33.

When the macroblock is an intra macroblock other than an I picture, the average value (intra DC) of this intra macroblock is transmitted.

In related picture signal encoding methods such as MPEG 2, the motion compensation is carried out using fixed size macroblock units, i.e. the motion compensation is carried out so as to have no relation with the quality of the picture signal to be encoded. However, with regards to this, portions showing more complicated movement can be reproduced in greater detail by making the motion compensation units smaller for these portions. Further, by the same token, the amount of data such as motion vectors for portions of little movement can be reduced by making the motion compensation units large. This is to say that efficiency can be improved if the motion compensation units are changed in response to the quality of the picture signal to be encoded.

The efficiency of variable length encoding (run length encoding, etc.) can also be improved even when carrying out encoding within a frame by using larger macroblocks for the same kind of regions. Moreover, efficiency can also be improved by making macroblocks for regions having complicated textures or edges smaller and, if possible, making the signal with the macroblock uniform, i.e. it is preferable for the size of the macroblocks to be changed in response to the quality of the picture to be encoded even from the point of view of encoding within a frame.

With regards to this, this embodiment changes the units for the macroblocks and the units for motion compensation in an appropriate manner in response to the qualities of the inputted picture signal. As a result of this, the coding efficiency is increased and the block distortion mentioned above in (1) is reduced.

Further, in related coding methods such as MPEG 2 DCT transforms were used to converge the electrical power of the signal in the way described above but it is difficult to alleviate the mosquito noise mentioned above in (2) using DCT transforms. Moreover, DCT transforms are basically block unit processing transforms and removal of the block distortion described in (1) is difficult.

In this embodiment, as described above, transform processing is carried out using wavelet transforms in, for example, frame units. As a result, block distortions that occurred due to the block unit processing occurring with DCT transforms are removed and mosquito noise is reduced.

In this embodiment, after wavelet transformations are performed, the macroblocks are reconfigured using wavelet transform coefficients for positions corresponding to each band and quantization and variable length encoding is then carried out. However, inverse wavelet transforms can be carried out in frame units and block distortion (1) are therefore not such a problem.

Further, the aforementioned mosquito noise (2) and ringing (3) can be abated because a base (filter tap number) of a length corresponding to each of the frequency bands is used in wavelet transforms.

With wavelet transforms, the tap numbers for the lowpass filters and the high-pass filters used at each of the filter banks do not have to be the same.

Further, it is not necessary to always use the same filters between each of the filter banks having a tree structure relationship. Namely, the filter coefficients (base length) can be changed in response to the frequency component (so that the most suitable filter coefficient (base) can be used at each layer). For example, the mosquito noise (2) and the ringing (3) can be reduced by using short tap filters for the high-frequency components and by using long tap filters for the low frequency components.

Moreover, in this embodiment, the size of the motion compensation units has been varied and the motion compensation and wavelet transformation has been combined. However, the size of the motion compensation units can also be fixed in the same way as in related MPEG2 methods. The block distortions (1) will then provide little problem because the wavelet transforms are carried out so as to bear no relation to the motion compensation units.

In this embodiment, wavelet transforms were carried out as the prescribed transform processing. However, types of orthogonal transform processing other than wavelet transform processing capable of changing the base length in an appropriate manner can be used as the prescribed transform processing.

Still further, in this embodiment processing was only carried out in frame units, but it is also possible to carry out this processing in other ways such as, for example, while switching between frame and field units in the way described in FIG. 5.

According to a picture encoding device and picture encoding method of the first aspect of the present invention, picture data is divided into encoding blocks of sizes corresponding to characteristics of the picture data and the picture data is encoded using units of the encoding blocks, with encoding efficiency being improved as a result.

According to a picture decoding device and picture decoding method of the first aspect of the present invention for dividing picture data into encoding blocks of sizes corresponding to characteristics of the picture data and decoding transmission data including at least encoded data encoded in the encoding block units, encoded data is decoded in the encoded block units. Encoded data can therefore be decoded in an efficient manner.

A recording medium of the first aspect of the present invention is characterized by picture data being divided into encoding blocks of sizes corresponding to characteristics of the picture data and encoded data being recorded encoded in units of the encoding blocks. A large amount of picture data can therefore be recorded.

According to a picture encoding device and picture encoding method of a second aspect of the present invention, picture data is divided into motion compensation blocks of sizes corresponding to characteristics of the picture data, motion vectors of the picture data are detected, an estimation picture for the picture data of the motion compensation blocks is generated by carrying out motion compensation based on the motion vectors, a difference picture is generated by calculating a difference of the picture data and the estimation data and the difference picture and the motion vectors are encoded. The encoding efficiency is therefore improved as a result.

According to a picture decoding device and a picture decoding method of the second aspect of the present invention, for dividing picture data into motion compensation blocks of sizes corresponding to characteristics of the picture data and detecting motion vectors for the picture data, generating an estimation picture for the picture data of the motion compensation blocks by carrying out motion compensation based on the motion vectors, generating a difference picture by calculating a difference of the picture data and the estimation picture and decoding transmission data including at least encoded data encoded with the difference picture and the motion vector, the estimation picture for the picture data for the motion compensation blocks is generated by carrying out motion compensation based on the motion vectors and the picture data is decoded by adding the estimation picture and the difference picture. Encoded data can therefore be decoded in a more efficient manner.

A recording medium of the second aspect of the present invention is characterized by dividing picture data into motion compensation blocks of sizes corresponding to characteristics of the picture data and detecting motion vectors for the picture data, generating an estimation picture for the picture data of the motion compensation blocks by carrying out motion compensation based on the motion vectors, generating a difference picture by calculating a difference of the picture data and the estimation picture, being recorded with encoded data encoded with the difference picture and the motion vector.

What is claimed is:

1. A picture encoding device comprising:
    dividing means for dividing picture data having certain characteristics into encoding blocks of certain sizes depending upon said characteristics of said picture data; and
    encoding means for encoding said picture data using units of said encoding blocks.

2. A picture encoding device according to claim 1, further comprising transform means for performing prescribed transform processing on said picture data using a plurality of said encoding block units and outputting transform coefficients, wherein said encoding means encodes said transform coefficients outputted by said transform means using said encoding block units.

3. A picture encoding device according to claim 2, wherein said transform means performs orthogonal transformation processing on said picture data.

4. A picture encoding device according to claim 3, wherein said transform means performs wavelet transformation processing on said picture data.

5. A picture encoding device according to claim 4, wherein said transform means comprises:
    filtering means for filtering said picture data;
    thinning-out means for thinning-out an output of said filtering means; and
    setting means for setting filtering coefficients for filtering said picture data at said filtering means.

6. A picture encoding device according to claim 5, wherein said encoding means comprises:
    quantizing means for quantizing and output ting said transform coefficients; and
    variable length encoding means for variable length encoding said quantization coefficients outputted by said quantizing means.

7. A picture encoding device according to claim 6,
    wherein said setting means selects in advance one of a plurality of filter coefficient sets and sets the selected filter coefficient set at said filtering means, and
    in addition to variable length-encoding said quantization coefficients, said variable length encoding means also variable length-encodes information indicating a filter coefficient set for inverse wavelet transforming said transform coefficients corresponding to said filter coefficient set selected by said setting means.

8. A picture encoding device according to claim 6, wherein, in addition to variable length-encoding said quantization coefficients, said variable length encoding means also variable length-encodes filter coefficients for inverse wavelet transforming said transform coefficients corresponding to filter coefficients set by said setting means, and variable length-encodes said filter means tap number.

9. A picture encoding device according to claim 1, wherein said encoding means further encodes position specifying information for specifying the position of said encoded block in said picture data.

10. A picture encoding device according to claim 9, wherein said position specifying means includes the size of said encoded block and information indicating the order of this encoded block in the encoding sequence.

11. A picture encoding method comprising the steps of:
    dividing picture data having certain characteristics into encoding blocks of certain sizes depending upon said characteristics of said picture data; and
    encoding said picture data using units of said encoding blocks.

12. A picture encoding method according to claim 11, further comprising the step of performing prescribed transform processing on said picture data using a plurality of said encoding block units,
    wherein said transform coefficients outputted by said transform means are encoded using said encoding block units.

13. A picture encoding device comprising:
    dividing means for dividing picture data having certain characteristics into motion compensation blocks of certain sizes depending upon said characteristics of said picture data;
    motion vector detecting means for detecting motion vectors of said picture data;
    estimation picture generating means for generating an estimation picture for said picture data of said motion compensation blocks by carrying out motion compensation based on said motion vectors;
    difference picture generating means for generating a difference picture by calculating a difference between said picture data and said estimation data; and
    encoding means for encoding said difference picture and said motion vectors.

14. A picture encoding device according to claim 13, wherein said dividing means divides said picture data into said motion compensation blocks in such a manner that a prescribed estimation error for said picture data is a minimum.

15. A picture encoding device according to claim 13, further equipped with transformation means for performing prescribed transformation processing on said difference picture and outputting transformation coefficients, wherein said encoding means encodes said transform coefficients.

16. A picture encoding device according to claim 15, wherein said transform processing is orthogonal transform processing.

17. A picture encoding device according to claim 16, wherein said transform processing is wavelet transform processing.

18. A picture encoding device according to claim 13, wherein said encoding means encodes said difference picture in prescribed encoding block units.

19. A picture encoding device according to claim 18, wherein said encoded block size is fixed or variable.

20. A picture encoding device according to claim 18, wherein said encoded block is the same as or different, to said motion compensation block.

21. A picture encoding device according to claim 18, further comprising:
    deciding means for deciding whether or not to encode said difference picture; and
    mean value calculating means for calculating a mean value for said picture data of said encoded block,
    wherein said encoding means encodes said difference picture when said deciding means decides to encode said difference picture and encodes the value for a difference between said mean value for the recording data corresponding to said difference data and said picture data when said deciding means decides not to encode said difference picture.

22. A picture encoding device according to claim 21, wherein said encoding means encodes said difference value and said mean value.

23. A picture encoding device according to claim 21, wherein said encoding means encodes the number and size of motion compensation blocks comprising encoded blocks when said encoded blocks comprise a plurality of said motion compensation blocks.

24. A picture encoding device according to claim 23, wherein said encoding means encodes said motion vectors together with said number and size of said motion compensation blocks comprising said encoded blocks only when said deciding means decides to encode said difference picture.

25. A picture encoding method comprising the steps of:
dividing picture data having certain characteristics into motion compensation blocks of certain sizes depending upon said characteristics of said picture data and detecting motion vectors for said picture data;
generating an estimation picture for said picture data of said motion compensation blocks by carrying out motion compensation based on said motion vectors;
generating a difference picture by calculating a difference of said picture data and said estimation picture; and
encoding said difference picture and said motion vector.

* * * * *